United States Patent
Vasseur et al.

(10) Patent No.: US 9,083,627 B2
(45) Date of Patent: Jul. 14, 2015

(54) ASSISTED TRAFFIC ENGINEERING FOR MINIMALISTIC CONNECTED OBJECT NETWORKS

(75) Inventors: Jean-Philippe Vasseur, Saint Martin d'Uriage (FR); Jonathan W. Hui, Foster City, CA (US)

(73) Assignee: Cisco Technology, Inc., San Jose, CA (US)

( * ) Notice: Subject to any disclaimer, the term of this patent is extended or adjusted under 35 U.S.C. 154(b) by 21 days.

(21) Appl. No.: 13/331,534

(22) Filed: Dec. 20, 2011

(65) Prior Publication Data
US 2013/0159548 A1    Jun. 20, 2013

(51) Int. Cl.
*H04L 12/729* (2013.01)
*H04L 12/751* (2013.01)
*H04L 12/803* (2013.01)

(52) U.S. Cl.
CPC .............. *H04L 45/125* (2013.01); *H04L 45/02* (2013.01); *H04L 47/125* (2013.01)

(58) Field of Classification Search
CPC ..... H04L 47/10; H04L 47/127; H04W 40/02; G06F 15/173; H04J 3/16
USPC ................... 709/238–244, 249; 370/229–331
See application file for complete search history.

(56) References Cited

U.S. PATENT DOCUMENTS

| | | | |
|---|---|---|---|
| 6,262,976 B1* | 7/2001 | McNamara | 370/254 |
| 7,373,660 B1 | 5/2008 | Guichard et al. | |
| 7,457,244 B1 | 11/2008 | Ye et al. | |
| 7,889,652 B1* | 2/2011 | Minei et al. | 370/230 |
| 2002/0085498 A1* | 7/2002 | Nakamichi et al. | 370/236 |
| 2003/0158965 A1* | 8/2003 | Koester | 709/239 |
| 2005/0169179 A1* | 8/2005 | Antal et al. | 370/231 |
| 2005/0271038 A1* | 12/2005 | Xin et al. | 370/351 |
| 2006/0176828 A1 | 8/2006 | Vasseur et al. | |
| 2007/0036079 A1 | 2/2007 | Chowdury et al. | |
| 2007/0047446 A1 | 3/2007 | Dalal et al. | |
| 2007/0047469 A1 | 3/2007 | Vasseur et al. | |
| 2007/0140233 A1* | 6/2007 | Agmon et al. | 370/389 |
| 2007/0177506 A1 | 8/2007 | Singer et al. | |
| 2007/0253416 A1 | 11/2007 | Raj | |

(Continued)

OTHER PUBLICATIONS

Dimitrelis, et al., "Autoconfiguration of Routers Using a Link State Routing Protocol", draft-dimitri-zospf-00.txt, IETF Internet Draft, Oct. 2002, 17 pages.

(Continued)

*Primary Examiner* — Chandrahas Patel
*Assistant Examiner* — Lan Huong Truong
(74) *Attorney, Agent, or Firm* — Parker Ibrahim & Berg LLC; James M. Behmke; Stephen D. LeBarron

(57) ABSTRACT

In one embodiment, a distributed intelligence agent (DIA), hosted on a border router that provides access for a computer network to a global computer network, determines a routing topology of the computer network, and also computes a traffic matrix for the computer network based on source and destination addresses of traffic traversing the DIA, the traffic matrix providing an estimate for an amount of traffic on each link of the routing topology. Accordingly, the DIA may determine one or more portions of the routing topology for which traffic engineering (TE) should be applied based on a threshold for traffic loads on the links, and may notify one or more nodes in the computer network to change its respective current next-hop in the routing topology to an alternate next-hop based on a TE solution computed by the DIA.

22 Claims, 20 Drawing Sheets

(56) References Cited

U.S. PATENT DOCUMENTS

| | | |
|---|---|---|
| 2008/0049622 A1 | 2/2008 | Previdi et al. |
| 2009/0041019 A1* | 2/2009 | He et al. .......................... 370/392 |
| 2009/0059793 A1* | 3/2009 | Greenberg ..................... 370/235 |
| 2010/0212011 A1* | 8/2010 | Rybak et al. ..................... 726/22 |
| 2011/0032819 A1* | 2/2011 | Schliwa-Bertling et al. . 370/229 |
| 2011/0199891 A1* | 8/2011 | Chen ............................. 370/218 |
| 2012/0182870 A1* | 7/2012 | Francini ......................... 370/235 |
| 2012/0224506 A1* | 9/2012 | Gredler et al. ................. 370/254 |

OTHER PUBLICATIONS

Winter, et al., "RPL IPv6 Routing Protocol for Low Power and Lossy Networks", draft-ietf-roll-rpl-19, IETF Internet Draft, Mar. 2011, 164 pages.

* cited by examiner

ASSISTED TRAFFIC ENGINEERING FOR MINIMALISTIC CONNECTED OBJECT NETWORKS

TECHNICAL FIELD

The present disclosure relates generally to computer networks.

BACKGROUND

Low-power and Lossy Networks (LLNs), e.g., sensor networks, have a myriad of applications, such as smart grid, smart cities, home and building automation, etc. Various challenges are presented with LLNs, such as lossy links, low bandwidth, battery operation, low memory and/or processing capability, etc. Large-scale IP smart object networks pose a number of technical challenges. For instance, the degree of density of such networks (such as Smart Grid networks with a large number of sensors and actuators, smart cities, or advanced metering infrastructure or "AMI" networks) may be extremely high: it is not rare for each node to see several hundreds of neighbors.

Traffic Engineering (TE) relates to the set of techniques, technologies, protocols, and algorithms used to make best use of network resources to meet specific service level agreements (SLAs) such as bounded latency, link utilization, etc., especially when such resources are relatively scarce. TE is a critical piece of LLNs (e.g., and the Internet of Things or IoT) due to the strict resource constraints that these networks must typically operate under. Built with link technologies that may only offer at most tens of Kbits/sec, the offered traffic load will typically be relatively high compared to the available network resources. The challenge is thus to design TE mechanisms that do not consume significant resources (e.g., control plane load, CPU processing, etc.) since they must operate over the same constrained networks as the data-plane traffic. This is especially challenging for IoT networks since they must operate under a very high scale (e.g., thousands or potentially millions of nodes).

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
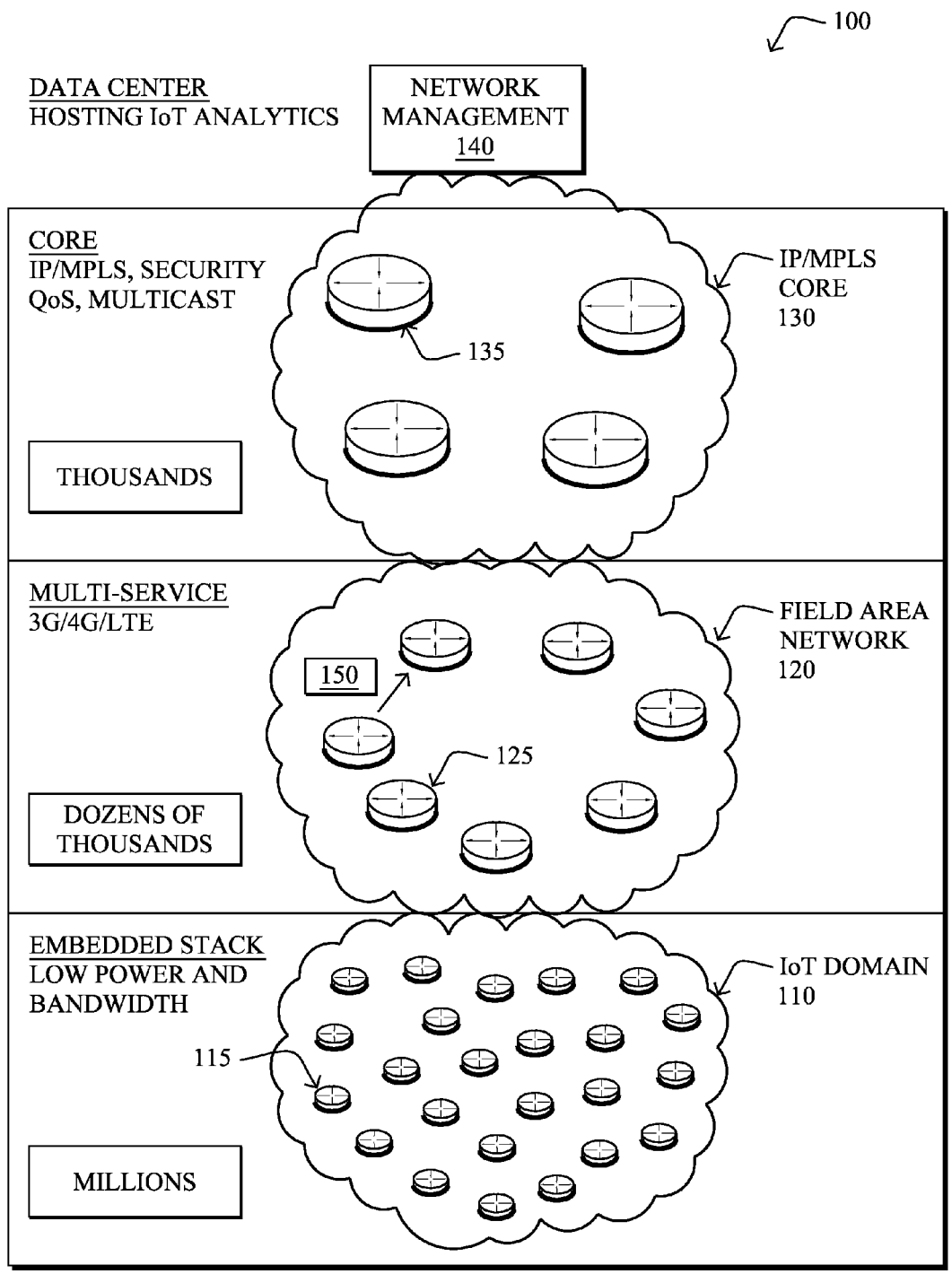
FIG. 1 illustrates an example computer network.

According to one or more embodiments of the disclosure, a distributed intelligence agent (DIA), hosted on a border router that provides access for a computer network to a global computer network, determines a routing topology of the computer network, and also computes a traffic matrix for the computer network based on source and destination addresses of traffic traversing the DIA, the traffic matrix providing an estimate for an amount of traffic on each link of the routing topology. Accordingly, the DIA may determine one or more portions of the routing topology for which traffic engineering (TE) should be applied based on a threshold for traffic loads on the links (potentially driven by SLA), and may notify one or more nodes in the computer network to change its respective current next-hop in the routing topology to an alternate next-hop based on a TE solution computed by the DIA.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example computer network 100 illustratively comprising nodes/devices interconnected by various methods of communication. For instance, the links (not shown) may be wired links or shared media (e.g., wireless links, PLC links, etc.) where certain nodes, such as, e.g., routers, sensors, computers, etc., may be in communication with other nodes, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

According to the illustrative network 100, a plurality of network "hierarchies" may be created, where each hierarchy may, though need not, consist of a generally disparate type of device and/or communication protocol. As shown, an IoT domain 110 (also referred to as an LLN 110) may consist of an embedded stack of "objects" 115, such as sensors, actuators, etc., as described above, interconnected by generally low-power and/or lossy links. Illustratively, the IoT domain may conceivably consist of millions of objects 115.

Each IoT domain 110 (only one shown for clarity) may be interconnected to a next hierarchical level, such as a field area network 120, which illustratively provides the edge of the "cloud" or core network 130. The field area network(s) 120 may interconnect one or more IoT domains to the core network 130, and generally comprises a plurality of routers 125 (or switches or gateways). In an example embodiment, communication at the field area networks may comprise multi-service protocols, such as "3G," "4G," "LTE," etc., as will be clearly understood in the art. Typically, the number of devices 125 within a field area network could reach dozens of thousands.

Ultimately, as noted, the field area networks 120 (one shown for clarity) are interconnected by a core network 130, such as an Internet Protocol (IP) network and/or Multi-Protocol Label Switching (MPLS) network of generally more-capable devices 135 (e.g., thousands of them), such as core routers, switches, etc. Generally, this hierarchical level controls the security, quality of service (QoS), multicast operation, etc. of the IoT domain in addition to supporting these features within the Field Area Network itself. A network management component 140 may exist within the core network 130, or else may be interconnected via the core network 130, to provide various high-level functionality, such as hosting of IoT analytics, network management services (NMS), etc. For example, the network management component 140 may consist of one or more servers configured to provide high-level control over the network operations of network 100, and may provide an interface to users (administrators), as described herein.

Data packets 150 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other. As mentioned, each hierarchy may, though need not, utilize a different protocol than each other, and may, in fact, utilize a different protocol than other sub-domains within a hierarchy (e.g., different IoT domains 110 or field area networks 120).

Figure 2A:
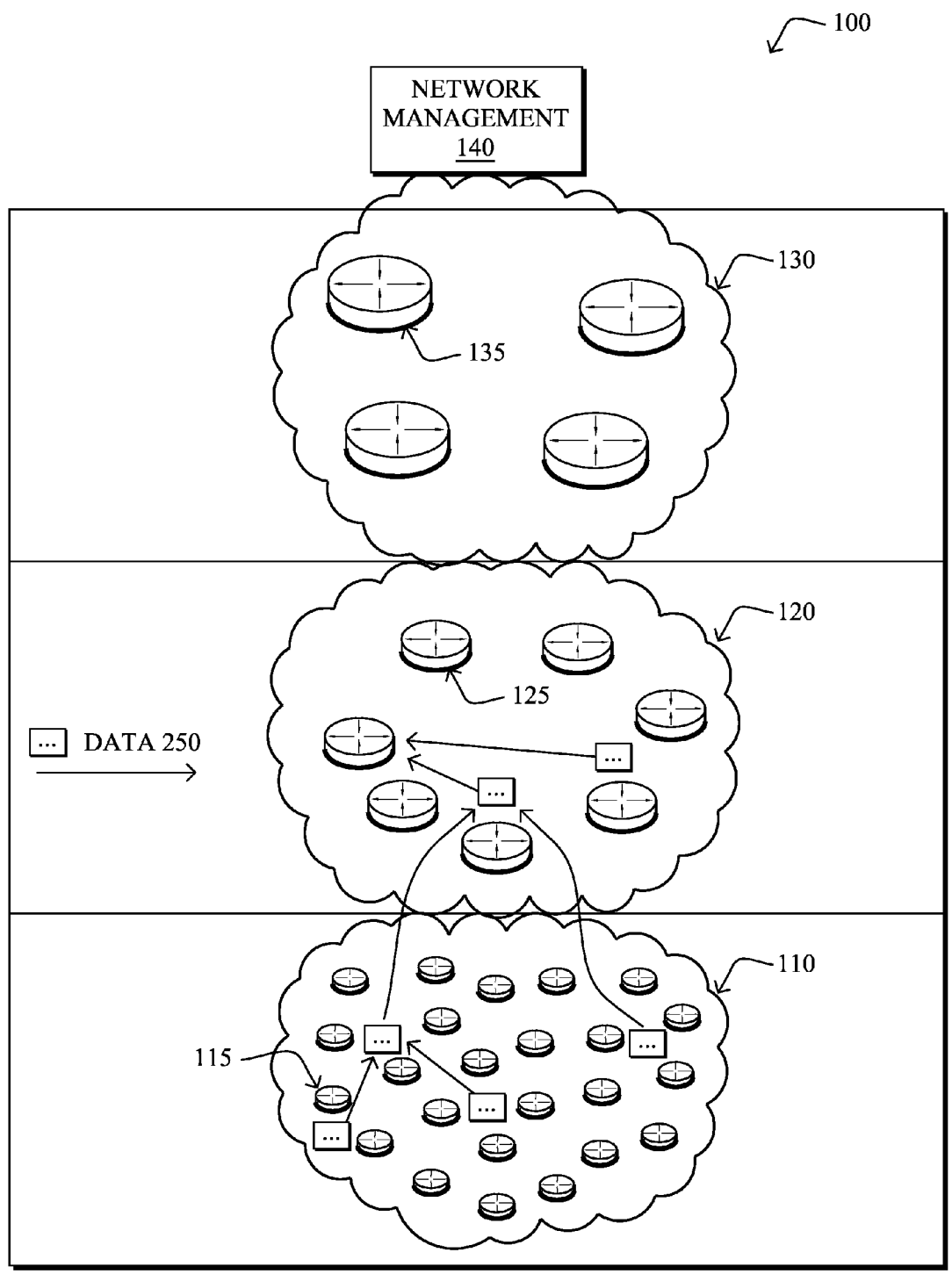
FIGS. 2A-2E illustrate examples of data flow within the computer network of FIG. 1.
Figure 2B:
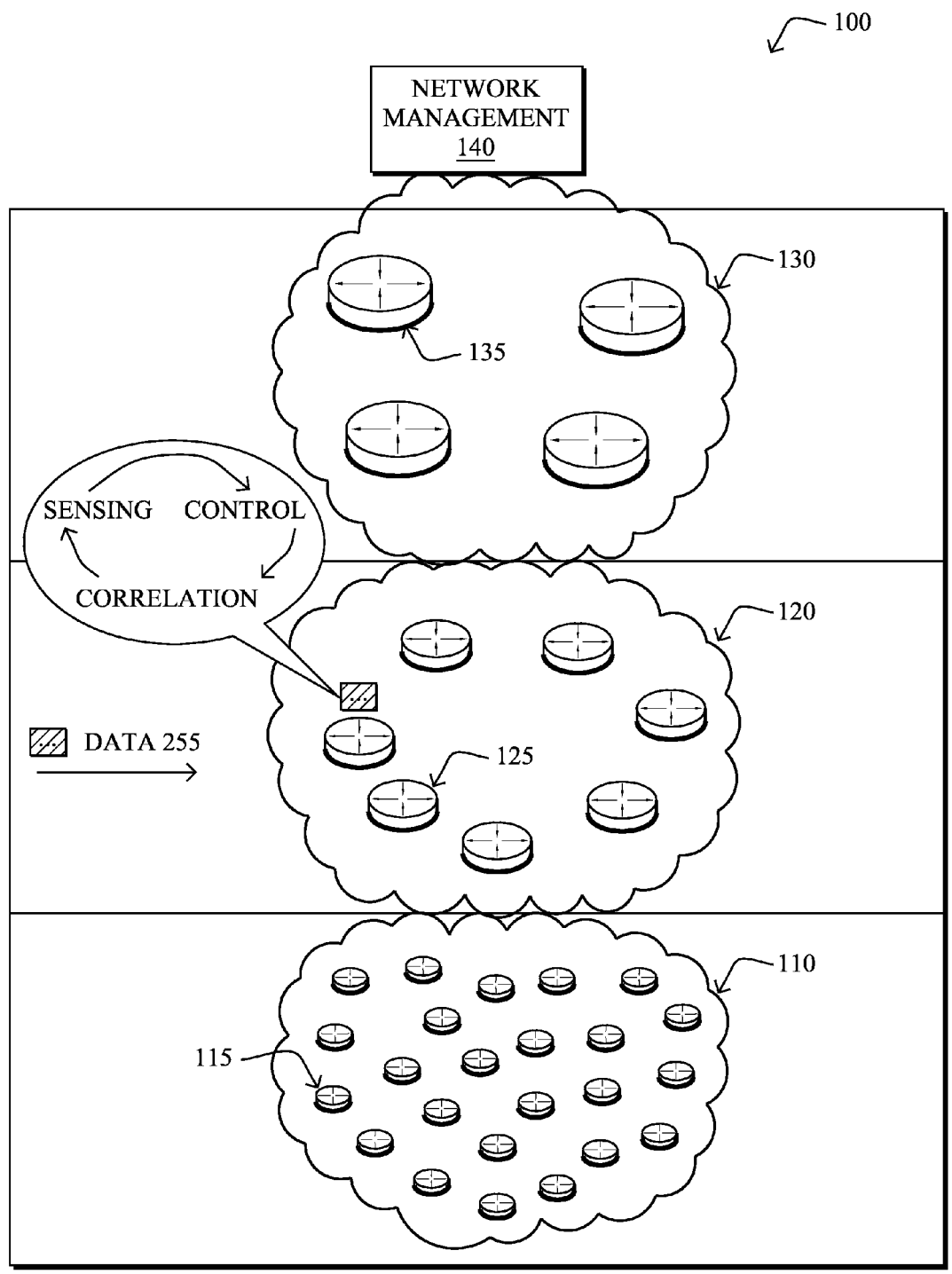
Figure 2C:
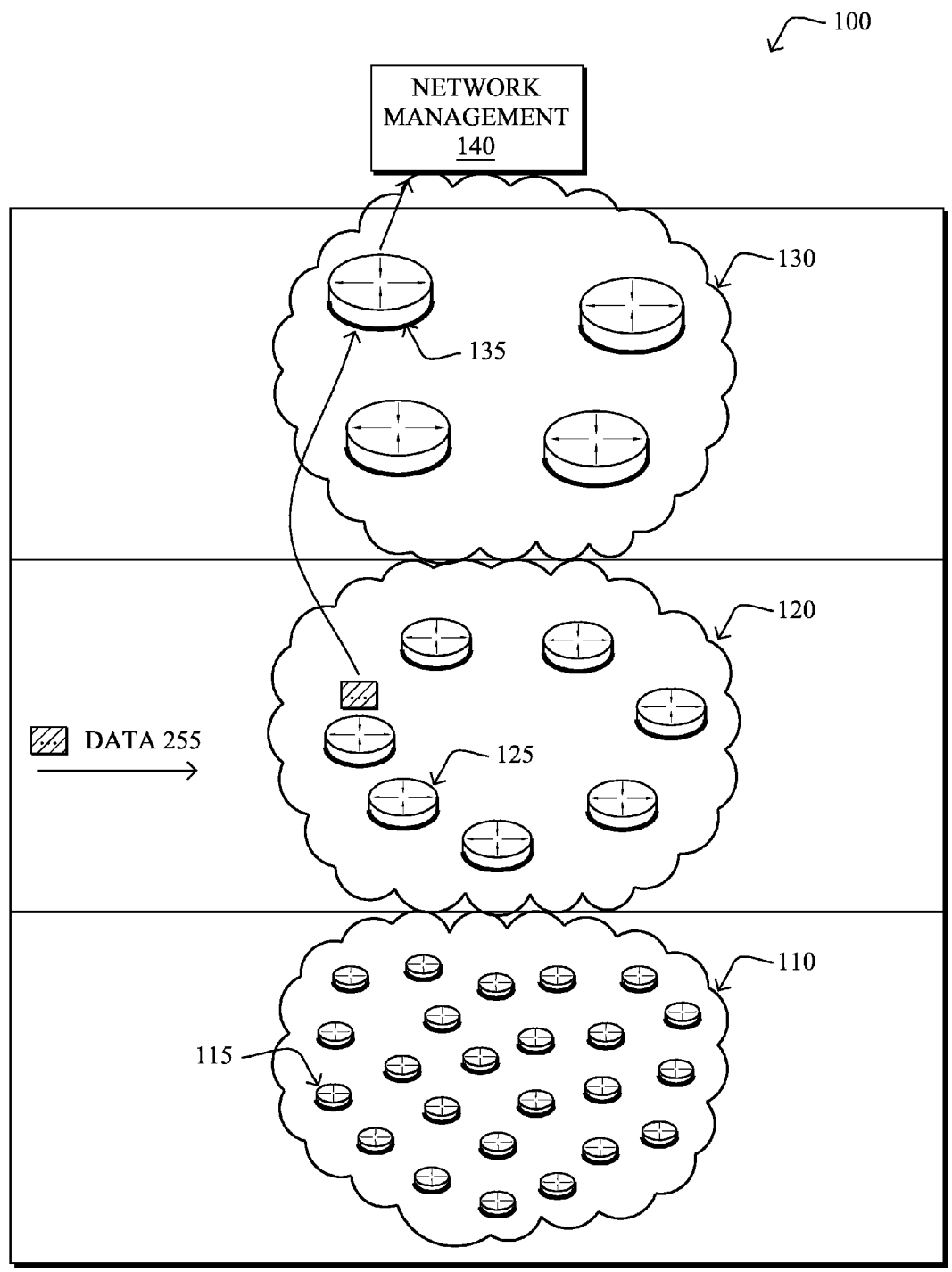
Figure 2D:
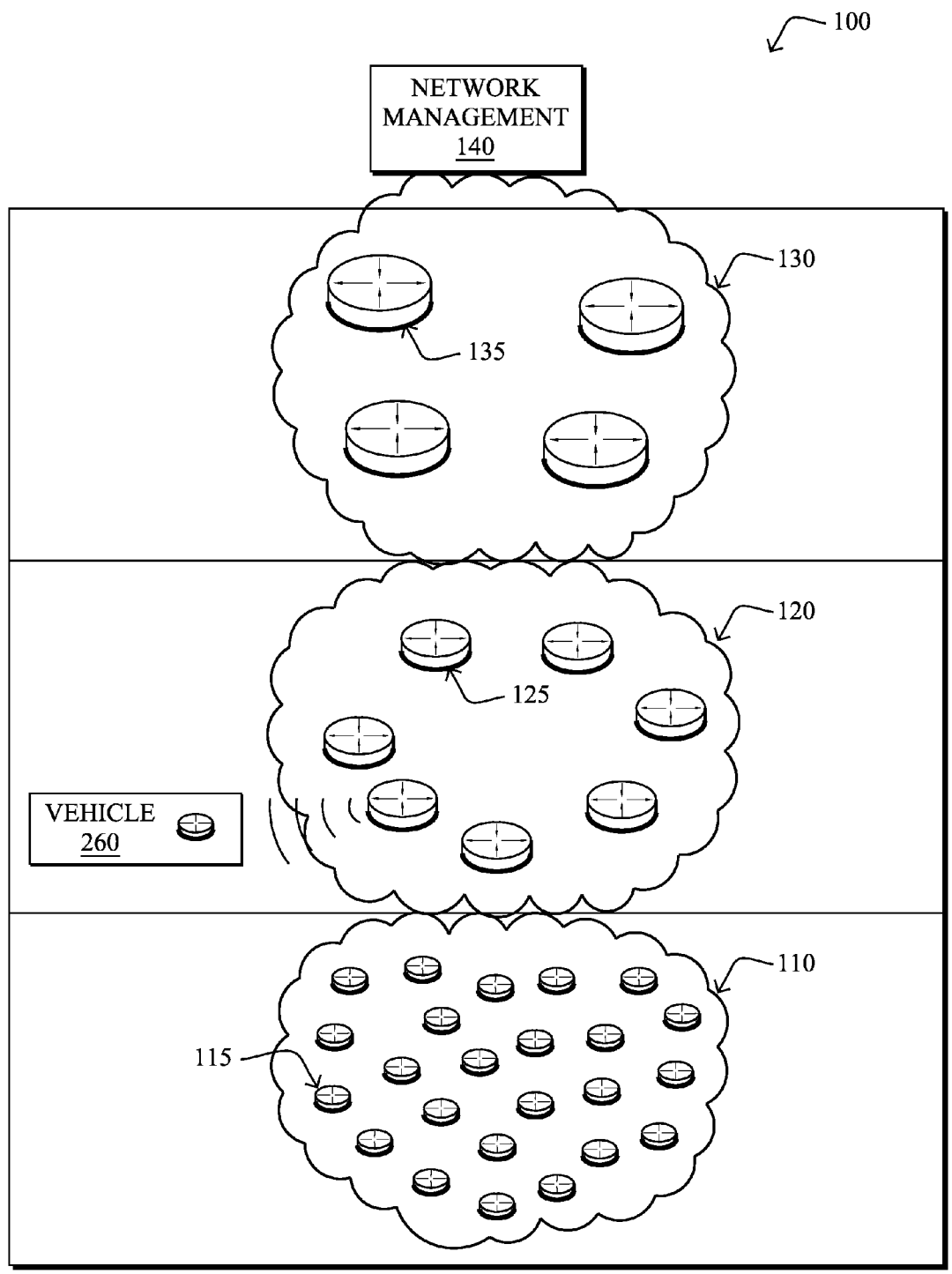
Figure 2E:
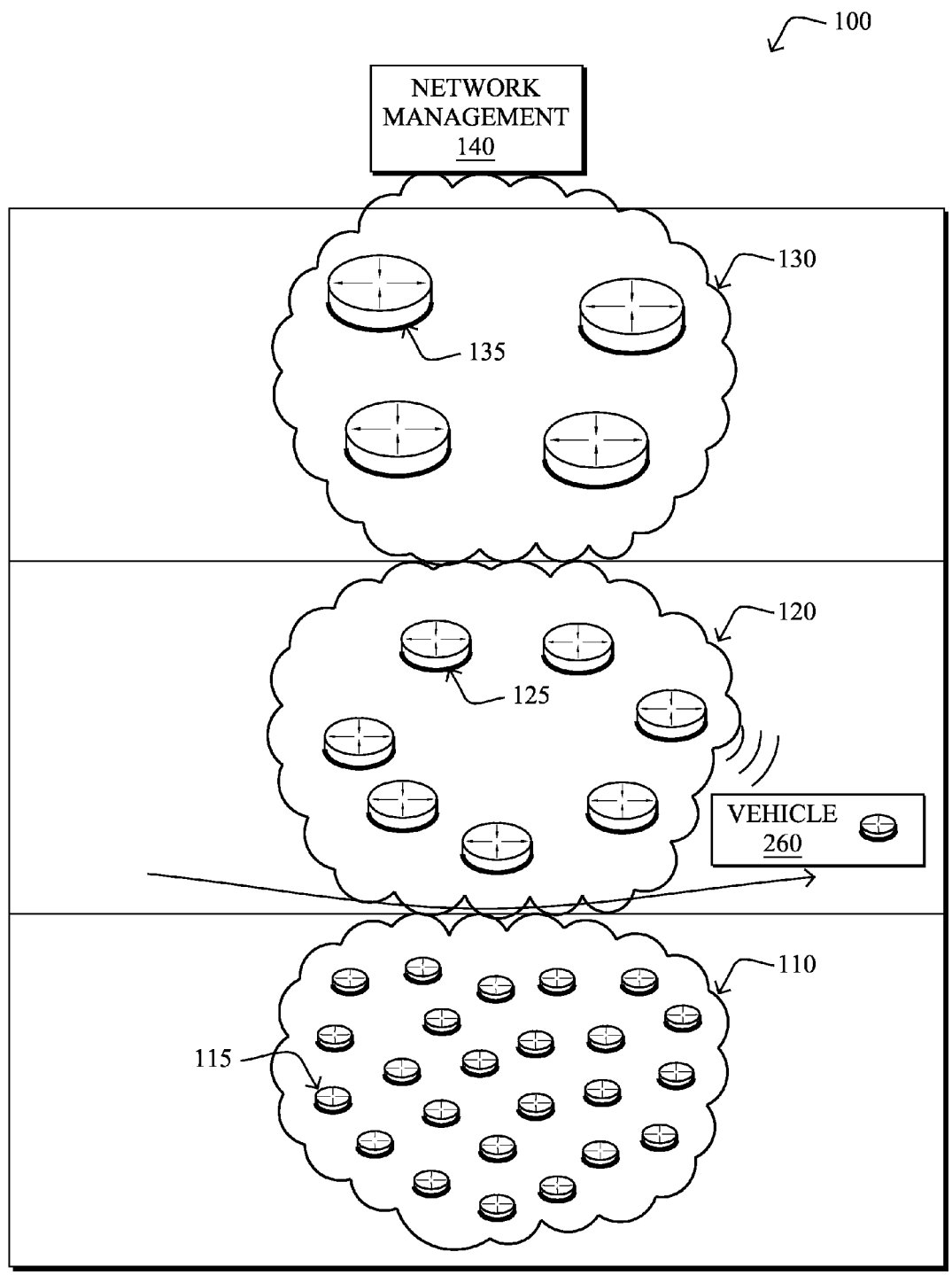

FIGS. 2A-2E illustrate example data flows within the computer network 100 of FIG. 1, such as in accordance with general IoT operation, and as may be used in accordance with the techniques described herein. For example, as shown in FIG. 2A, data 250 may be collected by various objects 115, and transmitted (e.g., as a packet 150) along the way to one or more field area network devices 125, and may be subjected to various degrees of aggregation, dropping, etc. along the way. The field area network devices 125 may then, as shown in FIG. 2B, apply further intelligence to the data 250, such as sensor applications, control, and correlation, and the processed data 255 may then be transmitted to the network management devices 140 as shown in FIG. 2C. Moreover, as a specific example of IoT operation to illustrate mobile objects, FIGS. 2D and 2E illustrate how an object 115, such as a vehicle 260 (generally, as a vehicle may actually comprise many network connected "objects"), may travel between IoT domains 110, and may be transferred between field area network devices 125 (such as field area routers or "FARs") or even field area networks 120 in general, depending upon proximity.

As noted above, over the past few years, the notion of smart connected objects such as sensors and actuators has opened the door to an endless number of applications such as smart grids, connected vehicles, smart cities, or smart healthcare to mention a very few. To that end, several "architectures" have been proposed, consisting of either connecting these devices through multi-protocol gateways or using IP (v6) end-to-end, in addition to various mixed options.

The idea of using multi-protocol gateways causes problems for a number of reasons, though are beneficial for protocol migration and limited in-time strategies offering a migration path from existing legacy protocols to IP. Some of the problems include operational complexity, lack of scalability (exponential number of protocol conversions), lack of QoS and routing consistency, single point of failure (the use of statefull multi-protocol gateways being a very costly option), security holes, etc.

Accordingly, a clear momentum in favor of IP end-to-end has emerged and a number of technologies have been developed and specified since 2007:
  Lightweight operating systems running on low-power micro-controllers equipped with a few Kbytes of RAM and Flash and 8/16-bit micro-controllers; and
  Optimized IPv6 stacks and the emergence of new low-power PHY/MAC technologies (e.g., IEEE 802.15.4, low-power Wifi, P1901.2, PRIME, HP GreenPHY, etc.).

After careful analysis of the IP protocol suite, it was recognized that new IP protocols were required for these highly constrained and harsh environments. Some key examples include:
  1) 6LoWPAN: an adaptation layer handling fragmentation for low MTU links in addition to header compression;
  2) RPL: a new routing protocol for LLNs;
  3) CoAP: a lightweight resource management protocol designed to run on low-power end devices, significantly lighter than SNMP; and
  4) Various optimization functions hosted at the link layer (e.g., frequency hopping for 15.4 g, PLC (P1901.2), etc.).

So far, the typical strategy consisted of implementing sophisticated networking protocols on constrained devices, responsible of handling QoS, routing, management, traffic engineering, sensing, algorithms for traffic reduction in the LLN, sophisticated strategies to increase channel capacity on low-bandwidth links, self-healing techniques for fast failure restoration in addition to constrained-routing, call admission control (CAC) and back-pressure mechanisms, etc. In other words, the goal has been to make the Internet of Things (IoT) as smart as possible, still while bounding the required resources at the edge the IoT (LLN).

Figure 3:
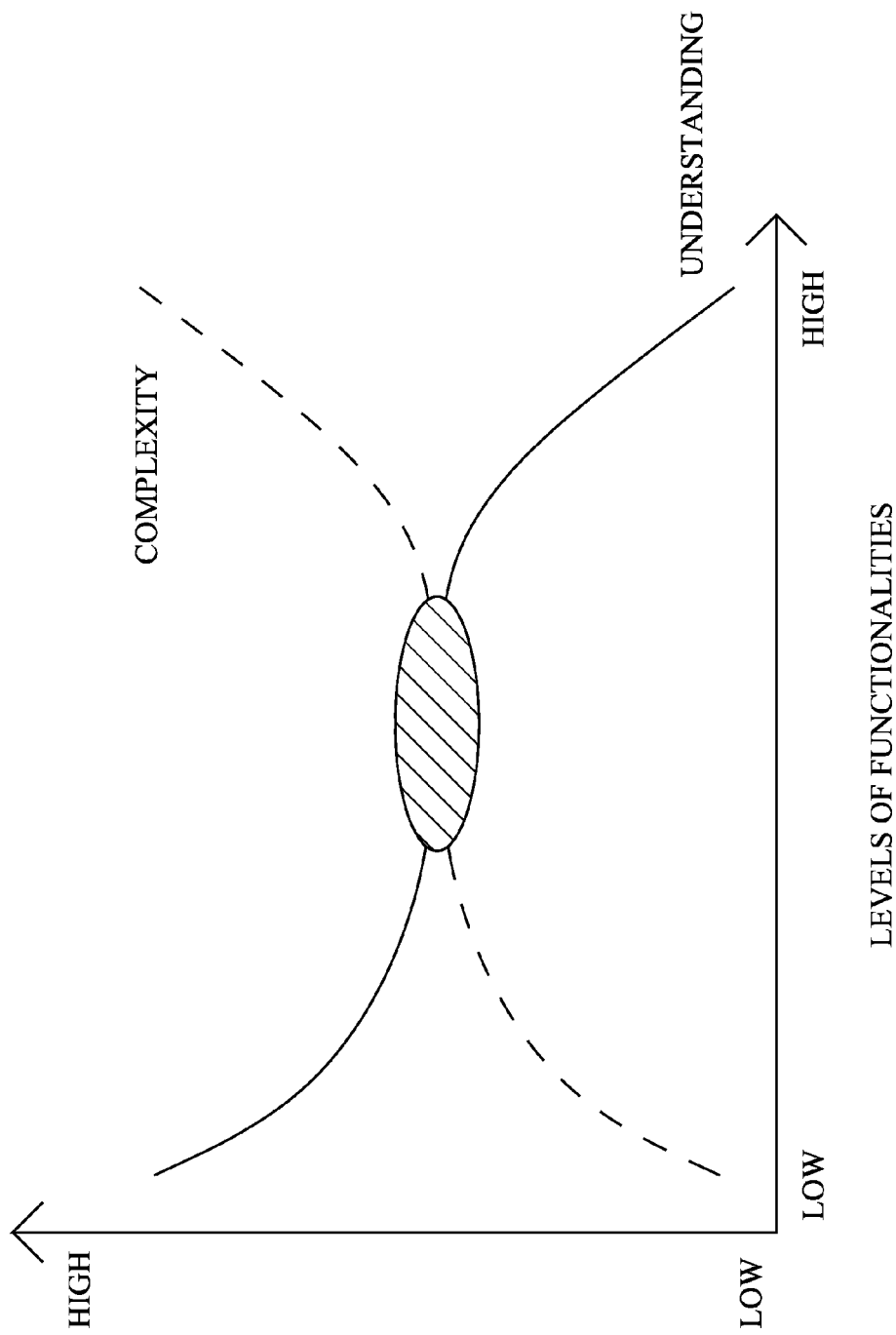
FIG. 3 illustrates an example trade-off between functionality and scalability in complex systems.

There is, however, a delicate trade-off between functionality and scalability in complex systems. That is, in many areas, one can obverse the phenomena shown in FIG. 3. As functionalities are added to devices, the complexity of the overall system combining all features (also simply referred to as "the network") increases to a point where incremental cost is acceptable before hitting an inflection point, at which time the overall understanding and scalability of that system drops dramatically. Although it is quite challenging to model mathematically such models with stochastic Petri networks or Markov chains, such an empirical analysis is mostly driven by years of experience designing and operating complex systems. Note that although scalability is a multi-polynomial function varying according to a number of factors, the weight of the "understanding" factor is undoubtedly large; in many circumstances, technologies have not been adopted in the field, not because they were intrinsically non-scalable from a technological standpoint but because understanding the overall system was too costly in light of the added value for the end-user. For example, from a purely technological standpoint, even though certain systems can be understood, as the level of functionality increases the number of pathological non-understood cases also grows extremely rapidly.

After a few years of deep technical investigations, the overall complexity to be supported by smart objects does not grow linearly with the size of these networks and the number of supported features, but rather it grows exponentially, causing the scalability of the overall system itself to collapse. In the case of the IoT, we can expect an amplification of this phenomena for two reasons: (1) The scale of such network largely exceeds the largest known networks so far with potentially millions of devices; and (2) unexpectedly, the design of lightweight protocols (with a small footprint in terms of memory and bandwidth usage) requires quite sophisticated techniques with unknown behavioral patterns leading to added complexity in this part of the network, also known as the LLN (Low-power and Lossy Networks) or IP Smart Object Networks.

An objective of the illustrative network architecture described herein is to rethink the current model consisting of adding distributed intelligence of end devices and instead to limit the intelligence to the minimum required to provide secured connectivity. As described below, intermediate agents hosted on edge devices of the Field Area Network (e.g. routers) referred herein to as edge routers are introduced that assist these end devices in a number of decision making processes (QoS, network management, traffic engineering, etc.) and closely interact with central intelligence (hosted or more capable computers, e.g., in a data center) in order to make appropriate decisions, for instance, thanks to learning machines fed by traffic observation (e.g., deep packet inspection), a set of objectives (e.g., Service Level Agreements or SLAs), performance monitoring, analysis of behavioral patterns and network dynamics (e.g., to trade-off between optimality and stability), etc.

In particular, the illustrative architecture address switching intelligence and network control to the router edge boundary. As pointed out above, it is worth thinking of a radically new networking model for the Internet of Things (IoT), leading to a radical shift in terms of networking in a number of areas such as routing, self-healing techniques, QoS, CAC, NMS, reliability or security. According to the embodiments described below, the techniques herein generally consist of moving the networking intelligence at the second-tier of the network, on routers located at the fringe of the LLN (sometimes referred to as LBRs: LLN Border Routers) where resources can be considered as "non-limited" by contrast with devices (sensors/actuators/tags) in the LLNs. The main principle lies into the ability for the LBR and other components (applications running on routers, out-of-band routers/servers, etc.) to host functions where the output of which is then provided to Minimalistic Connected Objects or "MCOs" (which may also be referred to as "dumb connected objects or "DCOs" as contrasted to "smart objects").

In this illustrative architectural model, sensors/actuators purposefully become IPv6 "minimalistic connected objects" as opposed to smart objects (the trend the whole industry has been promoting for the last decade).

As rationale, one primary technological reason lies in the ability to scale networks to a size an order of magnitude larger than the current Internet. Simple math shows that extremely large-scale LLNs imply very advanced technologies (not previously specified and/or known) in order to effectively manage these networks. It thus becomes important to note that such networks are to be autonomic, self-configured, and embedded with local intelligence to support self-healing technologies and auto-configuration, and capable of performing local troubleshooting. Breaking large domains into smaller ones helps to reduce the overall complexity, but only as a temporary measure.

By adopting a radically different strategy consisting of making these devices "merely connected" as opposed to "smart," the architecture described herein will enable a large eco-system, enable connectivity on extremely constrained devices (including energy scavenger enabled devices), and the network will be "fed" with valuable data, thus increasing the rationale for the network to host in-bound intelligence, making it the platform of the future.

In particular, a radically different architecture may be used for the Internet of Things (IoT)/LLNs whereby smart objects are replaced by Minimalistic Connected Objects (MCOs) limited to providing basic secure connectivity to an LBR, at the fringe of "classic IP networks" connecting LLNs. LBRs illustratively host Distributed Intelligence Agents (DIAs), which are software/hardware modules fed by a number of inputs such as, e.g., traffic flow observation using deep packet inspection, SLA requirements specified by the user and provided by a Central Intelligence Controller (CIC). DIAs may also host a learning machine observing the flows and also the network dynamics and behavior trends, such that the DIA may further perform a number of tasks interacting with MCOs to activate when/where/if the required networking features such as network management, routing, quality of service (QoS), call admission control (CAC), etc. in the network.

Figure 4:
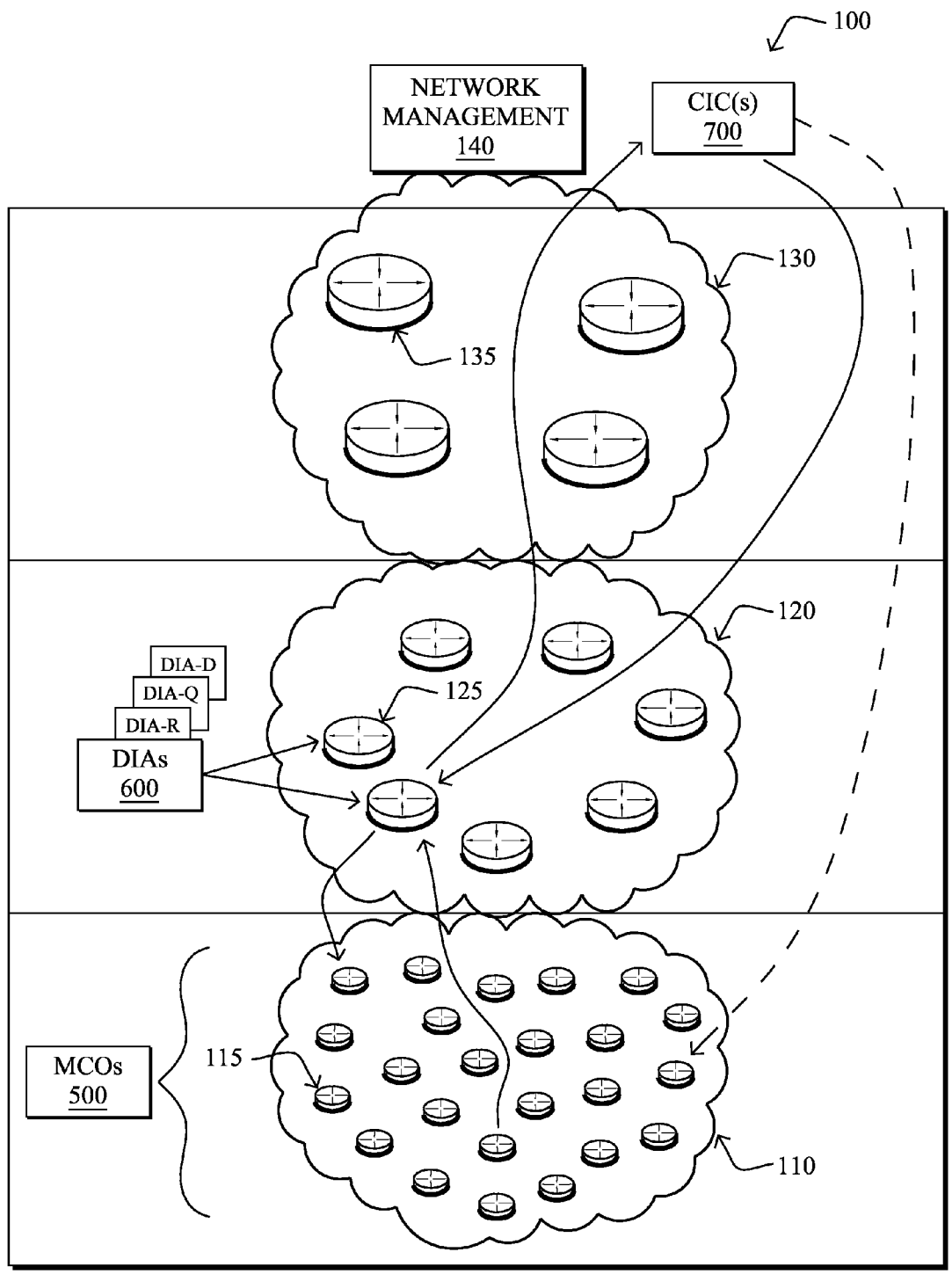
FIG. 4 illustrates an example view of the computer network in accordance with the architecture described herein for minimalistic connected objects (MCOs)

That is, an illustrative network architecture, as shown in FIG. 4, comprises one or more minimalistic connected objects (MCOs) 500, one or more distributed intelligence agents (DIAs) 600, and one or more central intelligence controllers (CICs) 700. Specifically, each MCO generally has limited intelligence sufficient to perform its respective designated task, securely join a computer network, and provide nominal state information, where the MCOs are not configured to perform complex application-specific data processing and complex networking tasks, such as making quality of service (QoS) decisions, participating in call admission control (CAC) operations, providing traffic engineering (TE) services, executing sophisticated reliability protocols, or extrapolating network management information, which contrasts with current IoT architectures. Also, the DIAs are configured to provide an edge to the computer network for the MCOs, and are responsible for intelligent networking management for the MCOs and for performing complex application-specific data processing for the MCOs. Lastly, the CICs operate within the computer network and are in communication with the DIAs to perform complex tasks for overarching control of MCO and DIA operation, and are also configured to provide one or more interfaces to receive a set of user-defined rules for the MCO and DIA operation.

Illustratively, the techniques described herein with respect to the illustrative architecture may be performed by hardware, software, and/or firmware, such as in accordance with respective processes specific to each type of device (MCO, DIA, CIC), which may contain computer executable instructions executed by a processor to perform functions relating to the novel techniques described herein, e.g., in conjunction with other processes executing on the respective devices. For example, the techniques herein may be treated as extensions to conventional protocols, such as various routing, communication, and/or management protocols, and as such, may be processed by similar components understood in the art that execute those types of protocols, accordingly.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while certain processes may be shown separately, those skilled in the art will appreciate that processes may be routines or modules within other processes.

According to the illustrative architecture, as noted above, a Minimalistic Connected Object (MCO) 500 is an object (e.g., sensor, actuator, radio frequency identifier (RFID) tag, or simple degenerated router) with an extremely lightweight processing requirement due to low intelligence and decision-making. By contrast with the current "Smart Objects" approach, an MCO has just enough intelligence to join a network using a degenerated routing approach, in a secure fashion, and provides just enough state information to the DIA/CIC (described below) with regards to its functionalities, resources, and supported capability. The MCOs generally perform no (self-directed) QoS or any form of CAC, TE, sophisticated reliability features, network management information (e.g., network statistics), and no application-specific data processing, since these functions are now hosted on the DIA 600, as described below.

Figure 5:
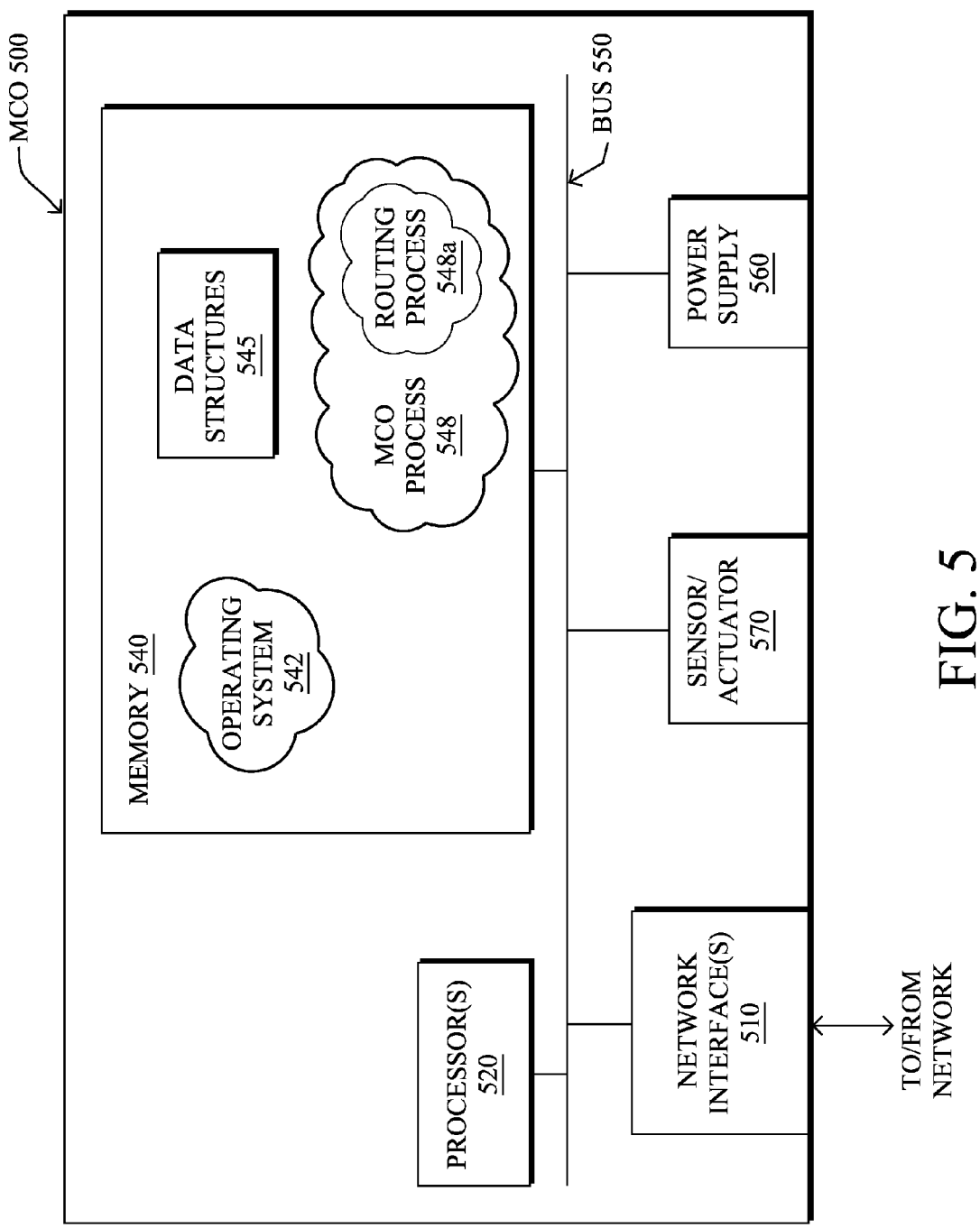
FIG. 5 illustrates an example of an MCO device.

FIG. 5 is a schematic block diagram of an example device 500 that may be used with one or more embodiments described herein as an MCO. The device may comprise one or more network interfaces 510 (e.g., wired, wireless, PLC, etc.), a processor 520, and a memory 540 interconnected by a system bus 550, as well as a power supply 560 (e.g., battery, plug-in, etc.). In addition, an MCO may generally comprise a sensor and/or actuator component 570.

The network interface(s) 510 contain the mechanical, electrical, and signaling circuitry for communicating data over links coupled to the network 100, i.e., in IoT domain 110. The network interfaces may be configured to transmit and/or receive data using a variety of different communication protocols. Note, further, that the nodes may have two different types of network connections 510, e.g., wireless and wired/physical connections, and that the view herein is merely for illustration. Also, while the network interface 510 is shown separately from power supply 560, for PLC the network interface 510 may communicate through the power supply 560, or may be an integral component of the power supply. In some specific configurations the PLC signal may be coupled to the power line feeding into the power supply.

The memory 540 comprises a plurality of storage locations that are addressable by the processor 520 and the network interfaces 510 for storing software programs and data structures associated with the embodiments described herein. Note that certain devices may have limited memory or no memory (e.g., no memory for storage other than for programs/processes operating on the device and associated caches). The processor 520 may comprise necessary elements or logic adapted to execute the software programs and manipulate the data structures 545. An operating system 542, portions of which are typically resident in memory 540 and executed by the processor, functionally organizes the device by, inter alia, invoking operations in support of software processes and/or services executing on the device. These software processes and/or services may illustratively comprise an "MCO process" 548, which may comprise one or more sub-processes, such as routing process/services 548*a*, as described herein.

As noted above, each MCO 500 has limited intelligence sufficient to perform its respective designated task (e.g., sense, actuate, route), securely join a computer network, and provide nominal state information. As such, MCO process 548 thus contains computer executable instructions executed by the processor 520 to perform functions related to such MCO actions, accordingly. As described herein, therefore, MCO process is not configured to perform complex application-specific data processing, make QoS decisions, participate in CAC operations, provide TE services, execute sophisticated reliability protocols, or extrapolate network management information. Routing process 548*a* is a generally degenerated routing process, and is kept simple enough to provide communication from the MCO 500 to other devices (other MCOs 500 or DIAs 600), accordingly. For example, topology information may be simply received from the DIAs as mentioned below, or else where MCOs are completely incapable of storing routing entries, routing process 548 may consist solely of providing mechanisms necessary for source routing techniques. That is, for source routing, other devices in the network can tell the less capable devices exactly where to send the packets, and the less capable devices simply forward the packets as directed. Alternatively, a minimalistic version of a routing protocol may be used, such as various simplified link-state protocols, e.g., a zeroconfiguration Open Shortest Path First or "zOSPF" as specified in an Internet Engineering Task Force (IETF) Internet Draft entitled "Autoconfiguration of routers using a link state routing protocol"<draft-dimitri-zospf-00> by Dimitrelis, at al. (October 2002 version), or else a simplified version of RPL, the full version of which is specified in the IETF Internet Draft entitled "RPL: IPv6 Routing Protocol for Low Power and Lossy Networks"<draft-ietf-roll-rpl-19> by Winter, et al. (Mar. 13, 2011 version).

According to the illustrative architecture described herein, another type of device, the Distributed Intelligence Agent (DIA) 600, consists of set of software/hardware modules hosted at the edge of the network (field area network 120), and are responsible for a number of networking and application oriented functionalities such as routing within the IoT/LLN 110, decisions on whether/if/how to dynamically activate QoS, CAC, Traffic Engineering, NMS-related processing (e.g., aggregation of networking statistics), application aware data processing (e.g., hosting an application that could interpret the data from the MCOs 500, potentially aggregate/drop data packets, trigger local actuation, etc.). The DIA 600 is hosted typically on a more capable device (e.g., an edge router) equipped with Deep packet Inspection, Internet Protocol flow information export (IPFIX) operational capability, etc., as may be appreciated by those skilled in the art.

Figure 6:
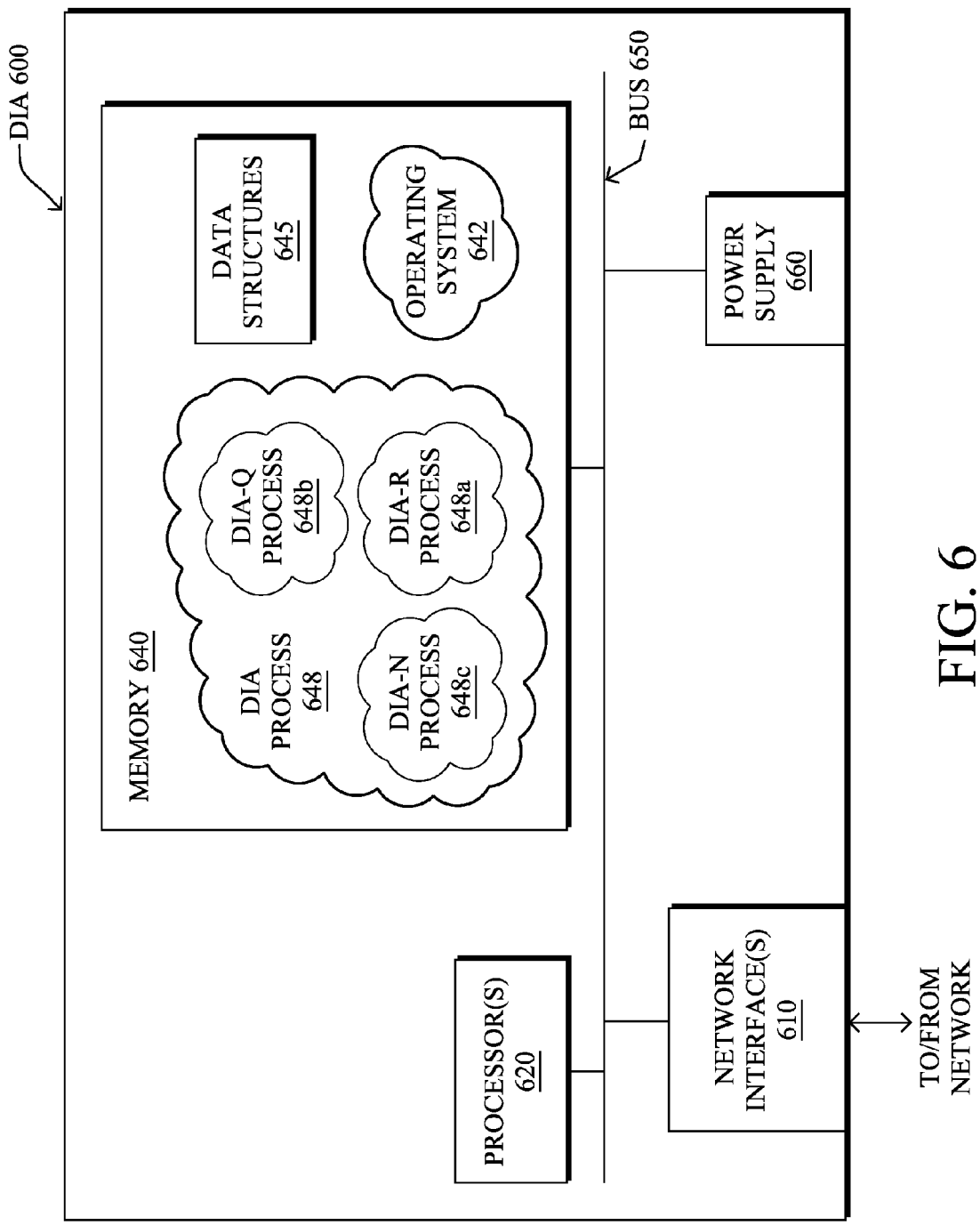
FIG. 6 illustrates an example of a distributed intelligence agent (DIA) device.

FIG. 6 is a schematic block diagram of an example device 600 that may be used with one or more embodiments described herein as a DIA. Similar to device 500, the DIA device 600 may comprise one or more network interfaces 610, at least one processor 620, and a memory 640 interconnected by a system bus 650, as well as a power supply 660 (e.g., plug-in). Generally, DIA device 600 is more capable than the limited MCO devices 500, and as such, may have greater processing capability, greater memory, etc.

Within the memory 640, an operating system 642 functionally organizes the device by, inter alia, invoking operations in support of software processes and/or services executing on the device, such as a "DIA process" 648, which may comprise one or more sub-processes, such as "DIA-R" process 648*a*, "DIA-Q" process 648*b*, "DIA-N" process 648*c*, etc., as described herein. That is, DIAs may be made of a set of intelligence modules each responsible for specific tasks: DIA-N (NMS) 648*c*, DIA-Q (QoS) 64*ab*, DIA-R (Routing) 648*a*, etc., in addition to application-related features (not related to the networking intelligence itself). Further, memory 640 may also be used to store one or more data structures 645, accordingly.

As noted above, each DIA 600 is configured to provide an edge to the computer network for the MCOs, and is responsible for intelligent networking management for the MCOs and for performing complex application-specific data processing for the MCOs. As such, DIA process 648 contains computer executable instructions executed by the processor 620 to perform functions related to such DIA actions, accordingly. As described herein, therefore, DIA process 648 is configured to perform complex application-specific data processing, such as interpreting data from the MCOs, aggregating data from the MCOs, dropping data from the MCOs, and triggering local actuation at the MCOs, as mentioned above. In addition, the DIA process 248 is further responsible for making QoS decisions (DIA-Q process 648*b*) for the MCOs, participating in CAC operations for the MCOs, providing TE services for the MCOs, and extrapolating network management information (DIA-N process 648*c*) for the MCOs, etc. Routing process (DIA-R) 648*a* contains computer executable instructions executed by the processor 620 to perform functions provided by one or more routing protocols, such as proactive or reactive routing protocols as will be understood by those skilled in the art. These functions may, on capable devices, be configured to manage a routing/forwarding table (a data structure 645) containing, e.g., data used to make routing/forwarding decisions.

Notably, DIAs 600 heavily rely on state reports provided by MCOs, traffic observation using deep packet inspections and IPFIX, but also closely interact with the CIC(s) 700 in order to determine the service level agreement and/or performance monitoring so as to determine whether network performances are aligned with the objectives (e.g., where performance results reports are provided by the DIA-N). In order to accomplish this, the various DIA processes 248 (modules 248*a-c* . . . ) may interact with each other: for example DIA-R (routing) may interact with the DIA-Q (QoS) so as to determine the consequences of a routing topology change on Quality of Service. Note that such collaboration is now possible, which is not the case with the current fully distributed models. That is, DIA 600 in general are intelligent modules in charge of performing tasks of various nature such as computing routing topologies, determining when/where/whether activating QoS in the network, performing local tasks related to NMS (instead of adopting a peer-to-peer network management function between the NMS and devices as in today's models), determining how to perform traffic engineering, etc. (Notably, the specifics of these features/algorithms and related protocols may be specified in detail elsewhere, and such specifics lie outside the scope of the present disclosure.)

Output decisions from the DIAs 600 result in sending messages (e.g., unicast or more rarely multicast messages) to MCOs 500 requesting behavioral changes, such as changes to forwarding decisions, activation of a QoS feature such as marking packets or applying priority to packets, activation and/or management of data generation (e.g., starting, stopping, and/or timing the sending of sensed data, such as if the sensed data has been determined as incorrect or non-coherent, or redundant, or unchanging, etc.). In addition, DIAs 600 may request the CIC(s) 700 to perform certain corrective actions, and CIC(s) may interact directly with an MCO 500, for example, in an attempt to download a new software/firmware upgrade on a dysfunctional device.

According to the illustrative architecture described herein, the final defined type of device, the Central Intelligence Controller (CIC) 700, is used to host more complex tasks for controlling the IoT domain 110, but also for receiving a set of rules defined by an end-user (e.g., specification of service level agreements (SLAs), levels of security, tasks for performance monitoring, etc.). The CIC(s) will have direct communication with the DIAs 600 that would make decisions and in turn communicate with MCOs, though in some cases the CIC may directly interact with MCOs 500.

Figure 7:
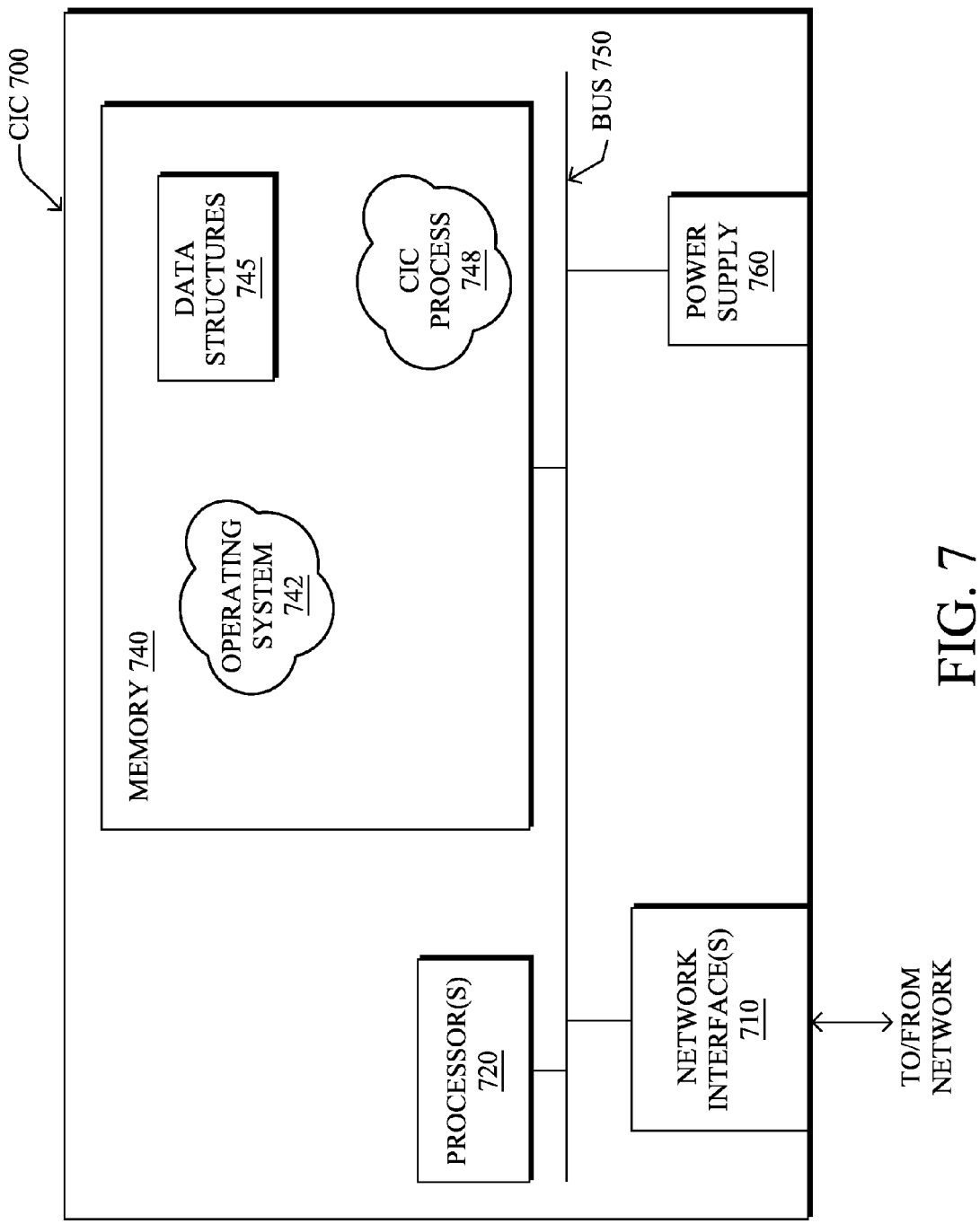
FIG. 7 illustrates an example of a central intelligence controller (CIA) device.

FIG. 7 is a schematic block diagram of an example device 700 that may be used with one or more embodiments described herein as a CIC. Similar to device 600, the CIC device 700 may comprise one or more network interfaces 710, at least one processor 720, and a memory 740 interconnected by a system bus 750, as well as a power supply 760 (e.g., plug-in). Within the memory 740 (which may store data structures 745), an operating system 742 functionally organizes the device by, inter alia, invoking operations in support of software processes and/or services executing on the device, such as a "CIC process" 748, as described herein.

In particular, as noted above, the CIC(s) 700 is(/are) configured to perform complex tasks for overarching control of MCO and DIA operation and also configured to provide one or more interfaces to receive a set of user-defined rules for the MCO and DIA operation. As such, CIC process 748 contains computer executable instructions executed by the processor 720 to perform functions related to such CIC actions, accordingly. As described herein, therefore, CIC process 748 is configured to perform complex tasks for overarching control of MCO and DIA operation performed by the CICs, such as security operations, performance monitoring, and SLA management, etc. In addition, as mentioned above, the CIC process 748 may also be configured for receiving instructions from the DIAs, and to correspondingly update MCO operation (e.g., via the DIAs or directly to the MCOs).

Such an architecture as described above specifies a strong paradigm shift from conventional computer architectures. For example, in contrast with current models, QoS is activated on each node regardless of traffic observation and SLAs, whereas in this model an external node (hosting the DIA) determines if/when/whether QoS must be activated based on traffic observation and SLAs provided by the CIC. In today's network, routing is either fully centralized (e.g., in most optical/SDH networks) or distributed. In the architecture as described herein, however, the role of the LBR (DIA 600) is to iteratively improve and/or build the routing topology if/when/where required. The NMS paradigm is also changed: instead of a peer-to-peer model between an NMS and device, intermediate intelligence is added into the network, thus performing a number of NMS tasks at the DIAs, accordingly.

Assisted Traffic Engineering

As noted above, large-scale IP smart object networks pose a number of technical challenges. For instance, the degree of density of such networks (such as Smart Grid networks with a large number of sensors and actuators, smart cities, or advanced metering infrastructure or "AMI" networks) may be extremely high: it is not rare for each node to see several hundreds of neighbors. This is particularly problematic for LLNs, where constrained links can wreak havoc on data transmission.

As also noted, Traffic Engineering (TE) relates to the set of techniques, technologies, protocols, and algorithms used to make best use of network resources to meet specific service level agreements (SLAs) such as bounded latency, link utilization, etc., especially when such resources are relatively scarce. TE is a critical piece of LLNs (e.g., and the Internet of Things or IoT) due to the strict resource constraints that these networks must typically operate under. Built with link technologies that may only offer at most tens of Kbits/sec, the offered traffic load will typically be relatively high compared to the available network resources. The challenge is thus to design TE mechanisms that do not consume significant resources (e.g., control plane load, CPU processing, etc.) since they must operate over the same constrained networks as the data-plane traffic. This is especially challenging for IoT networks since they must operate under a very high scale (e.g., thousands or potentially millions of nodes).

Notably, Traffic Engineering has been used since data packet networks have been in existence, and a number of technologies have been developed over the past few decades, such as IP Traffic Engineering and MPLS-TE. IP Traffic Engineering typically relies on heavy traffic matrix collection, off-line link metric cost computation, and a detailed knowledge of the traffic profiles. MPLS Traffic Engineering, on the other hand, can either be used with distributed techniques using CSPF (constrained SPF) as a path computation engine, RSVP-TE for signaling of Label Switched Paths, Call Admission Control for bandwidth accounting on a per priority level, and MPLS for label switching to steer traffic on non-IP paths (not following the path computed by the IP routing protocols). In addition, off-line path computation engines (PCEs) may be used whereby routers (Path Computation Clients) send requests to a PCE that would return a computed path for the label switched path (LSP), in order to perform intra or inter-area domain LSP, or even perform global optimization of a set of TE-LSPs in the network aimed at solving NP-Complete problems.

Unfortunately, none of these techniques are applicable to LLNs/IoT networks. For example MPLS-TE requires heavy computation engines and the complex and heavy control traffic load for signaling with CAC are not feasible for LLNs. Furthermore, these costs grow with the number of nodes in the network, a property that does not fit well with the typical large-scale environments of LLNs, such as IoT networks, where potentially millions of constrained nodes (e.g., MCOs) may exist.

According to the novel techniques herein, therefore, a novel TE approach is described that consumes almost no resources in the IoT network (e.g., control-plane traffic, memory consumption, CPU load, etc.). Instead, the techniques herein rely on the LLN Border Router (LBR) or DIA 600 to engineer traffic within the IoT. In particular, as described below, the techniques herein take advantage of the dominant P2MP (point-to-multipoint) and MP2P (multipoint-to-point) traffic flow characteristics in IoT networks to nearly eliminate all the control traffic, memory, and CPU overhead in collecting a traffic matrix. (For the remaining traffic flows, a specific embodiment includes a triggered notification mechanism to ensure that those remaining flows are included in the traffic matrix.)

According to the techniques described below, the traffic matrix is then checked against the available network resources using explicit congestion notifications or by retrieving the network capacity from the link layer or via path recording to identify the congested areas and traffic engineering actions may be triggered consisting of modifying the routing adjacencies (without modifying link costs). In this manner, the Traffic Engineering techniques do not require retrieval of heavy P2P (point-to-point) traffic flow statistics, do not require extra signaling in the network, and do not make use of link cost adjustments, but instead modify the routing adjacency without being tied to any specific routing protocols.

Specifically, according to one or more embodiments of the disclosure as described in detail below, a distributed intelligence agent (DIA) 600, hosted on a border router that provides access for a computer network to a global computer network, determines a routing topology of the computer network, and also computes a traffic matrix for the computer network based on source and destination addresses of traffic traversing the DIA, the traffic matrix providing an estimate for an amount of traffic on each link of the routing topology. Accordingly, the DIA may determine one or more portions of the routing topology for which traffic engineering (TE) should be applied based on a threshold for traffic loads on the links, and may notify one or more nodes (e.g., MCOs 500) in the computer network to change its respective current next-hop in the routing topology to an alternate next-hop based on a TE solution computed by the DIA.

Illustratively, the techniques described herein with relation to the DIA (or LBR) actions may be performed by hardware, software, and/or firmware, such as in accordance with the DIA process 648 (or more particularly, a suitable sub-module "648x"), which may contain computer executable instructions executed by the processor 620 to perform functions relating to the novel techniques described herein. Alternatively, with relation to the MCO (or LLN device) actions may be performed by hardware, software, and/or firmware, such as in accordance with the MCO process 548, which may contain computer executable instructions executed by the processor 520 to also perform functions relating to the novel techniques described herein.

Figure 8:
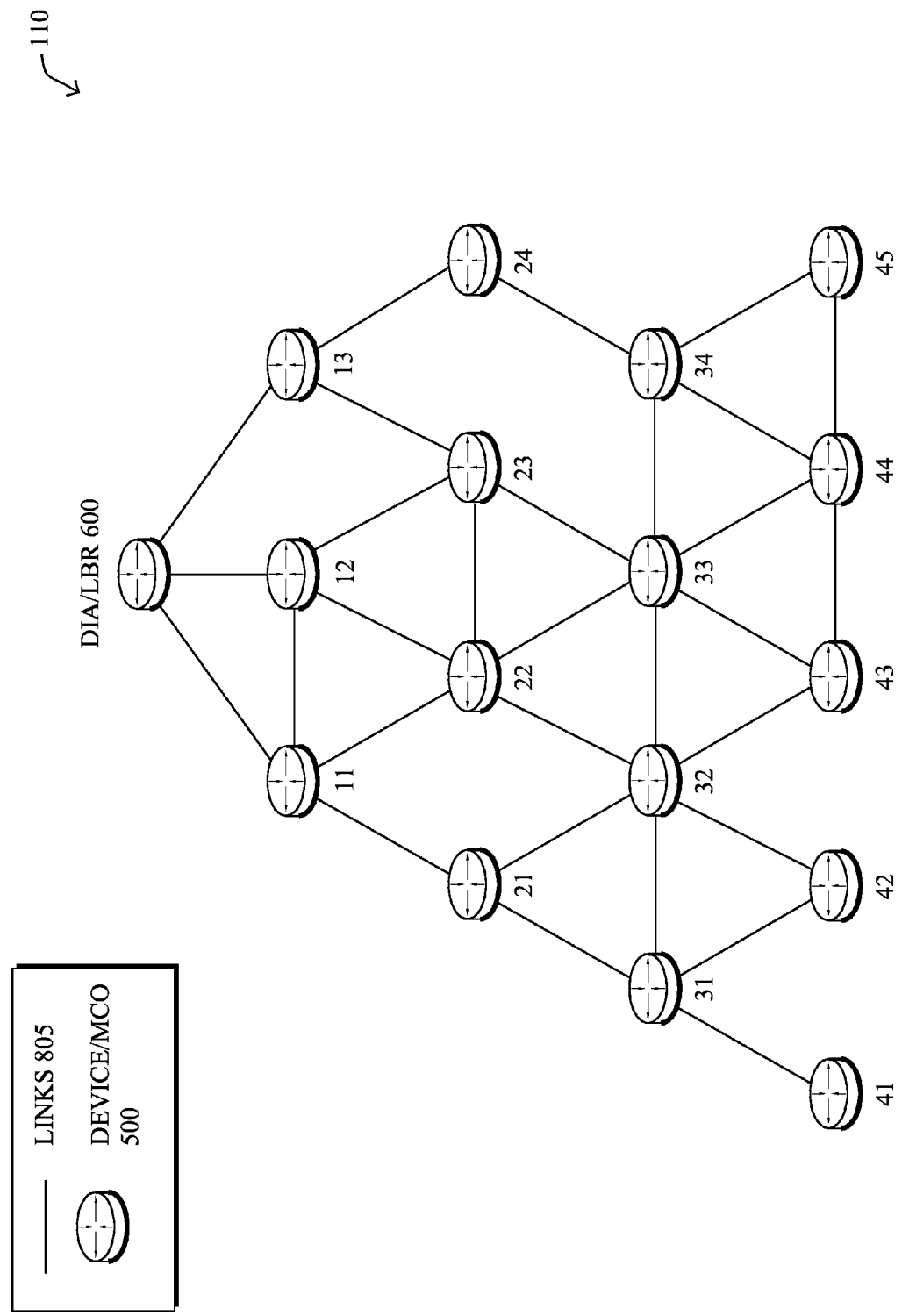
FIG. 8 illustrates an example network domain (LLN or IoT domain)

In addition, as an example representation of an LLN or IoT domain 110 of FIG. 1, FIG. 8 is a schematic block diagram of an example computer network 800 illustratively comprising nodes/devices (e.g., labeled as shown, "LBR/root," "11," "12," . . . "45,") interconnected by various methods of communication. For instance, the LBR/root device may be configured as a DIA 600, while the remaining devices 11-45 may be MCOs 500, according to the illustrative architecture described above.

Operationally, the techniques herein generally rely on determining a corresponding routing topology, computing a traffic matrix, identifying areas where traffic should be engineered, and remotely controlling modification to routing topology. Accordingly, a routing topology of the computer network may be determined by a DIA 600 hosted on a border router (e.g., LBR) that provides access for the computer network to a global computer network.

As noted above, the example RPL protocol provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 150, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements. Note that while the RPL protocol may define a complete set of functionalities, in order to maintain a simplified process on the MCOs, a reduced version of RPL may be used, e.g., a minimal subset of functionalities to create a routing topology, particularly as described in detail herein. Note also that the techniques herein are not an extension or modification of an existing routing protocol, but instead merely utilize an underlying routing protocol to determine the routing topology. As such, though RPL is illustratively shown and described, the techniques herein may be used with other suitable protocols, such as variants of RIP (to build trees), or even adaptation of lightweight link state protocols such as zOSPF, OLSR, etc., each as will be understood by those skilled in the art.

With reference to RPL, or distance vector routing protocols generally, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may be built (e.g., by routing process 548*a*) based on an Objective Function (OF), the role of which to specify rules on how to build the DAG (e.g. number of parents, backup parents, etc.). However, to keep the process simple, DAGs may be built by MCOs without the use of an Objective Function, and may instead use very basic next-hop selection algorithms, again, as particularly described herein.

Figure 9:
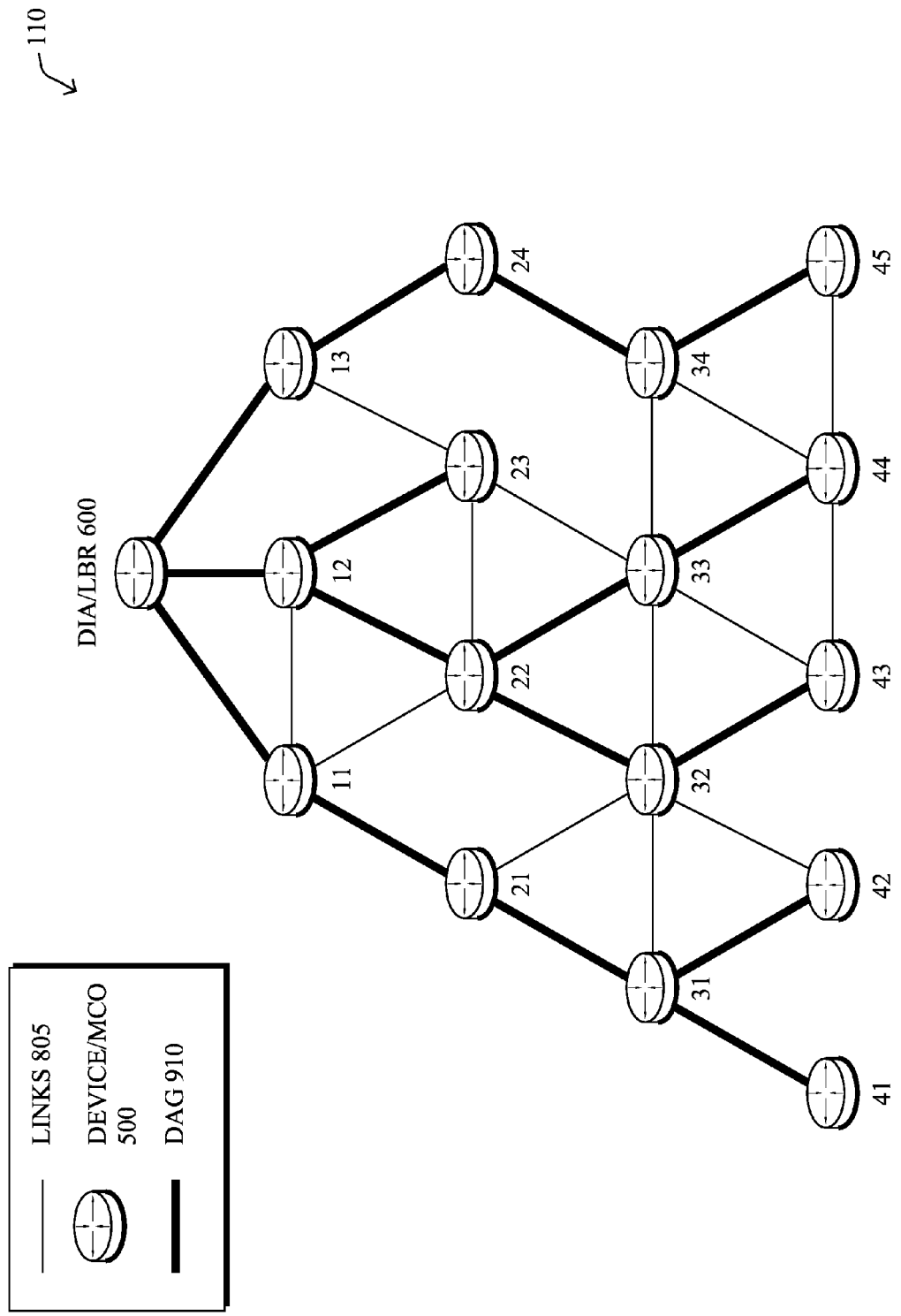
FIG. 9 illustrates an example routing topology (a directed acyclic graph (DAG)) within the particular network domain of FIG. 8.

According to this component of the techniques herein, therefore, the DIA determines a current routing topology within the corresponding computer network of FIG. 8. For instance, FIG. 9 illustrates an example current routing topology (a directed acyclic graph (DAG)) 910 that may be created within the network domain of FIG. 8, e.g., through any suitable routing protocol techniques as mentioned above. For instance, certain links 805 may be selected for each node to communicate with a particular next-hop or "parent" (and thus, in the reverse, to communicate with a child, if one exists). These selected links form the DAG 910 (shown as bolded lines), which extends from the root node toward one or more leaf nodes (nodes without children). Traffic/packets 150 may then traverse the DAG 910 in either the upward direction toward the root or downward toward the leaf nodes. Note that the routing topology, DAG 910, may be, though need not be, optimized, and no assumptions are made as to the quality of the topology built by the underlying routing protocol.

===Computation of the Traffic Matrix===

As stated, one of the main challenges with TE is the understanding of the traffic matrix. Classic IP networks make use of heavy computation and communications to gather the traffic matrix between n point computation complex array with n(n−1) flows, using management information bases (MIBs) or external SLA probes that generate large amounts of traffic.

Conversely, the approach taken by the techniques herein rest on the fact that the vast majority of traffic is P2MP or MP2P and transits through the LBR that has relatively significant resources (e.g., power, memory, and CPU). Furthermore, LBRs typically have significant knowledge of the LLN routing topology (e.g., when distance vector protocols are used in the networks).

Figure 10:
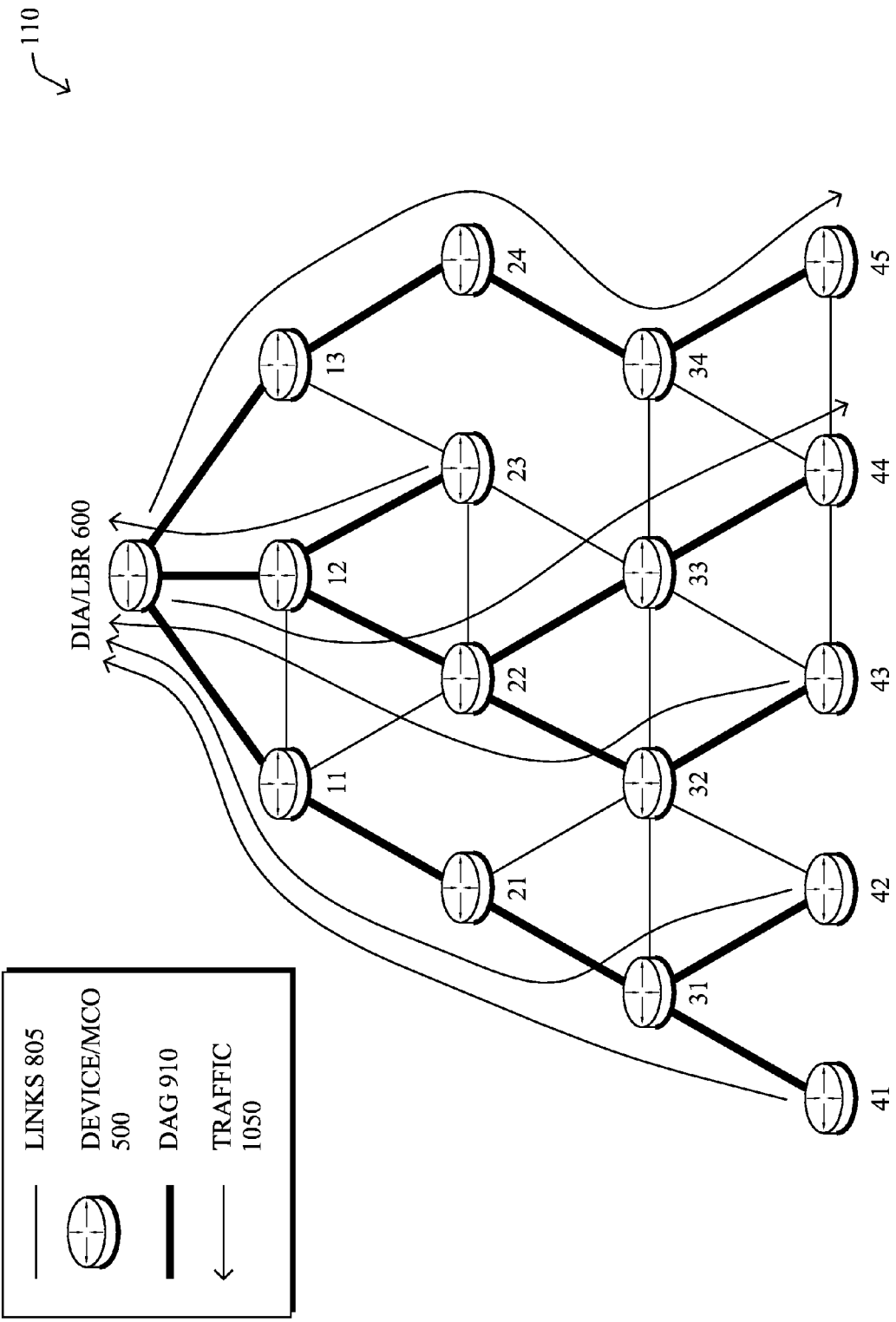
FIG. 10 illustrates an example of traffic in the routing topology of FIG. 9.

As shown in FIG. 10, upon receiving traffic/packets 1050 (for each individual packet, i.e., all traffic, or else using sampling techniques, i.e., a sample of all the traffic), the DIA 600 processes the packet headers (as will be easily understood in the art), retrieving the source and destination addresses, and optionally the packet size and an indication of classes of service (CoS), e.g., if an IPv6 DS byte be used for specific CoS traffic.

Figure 11:
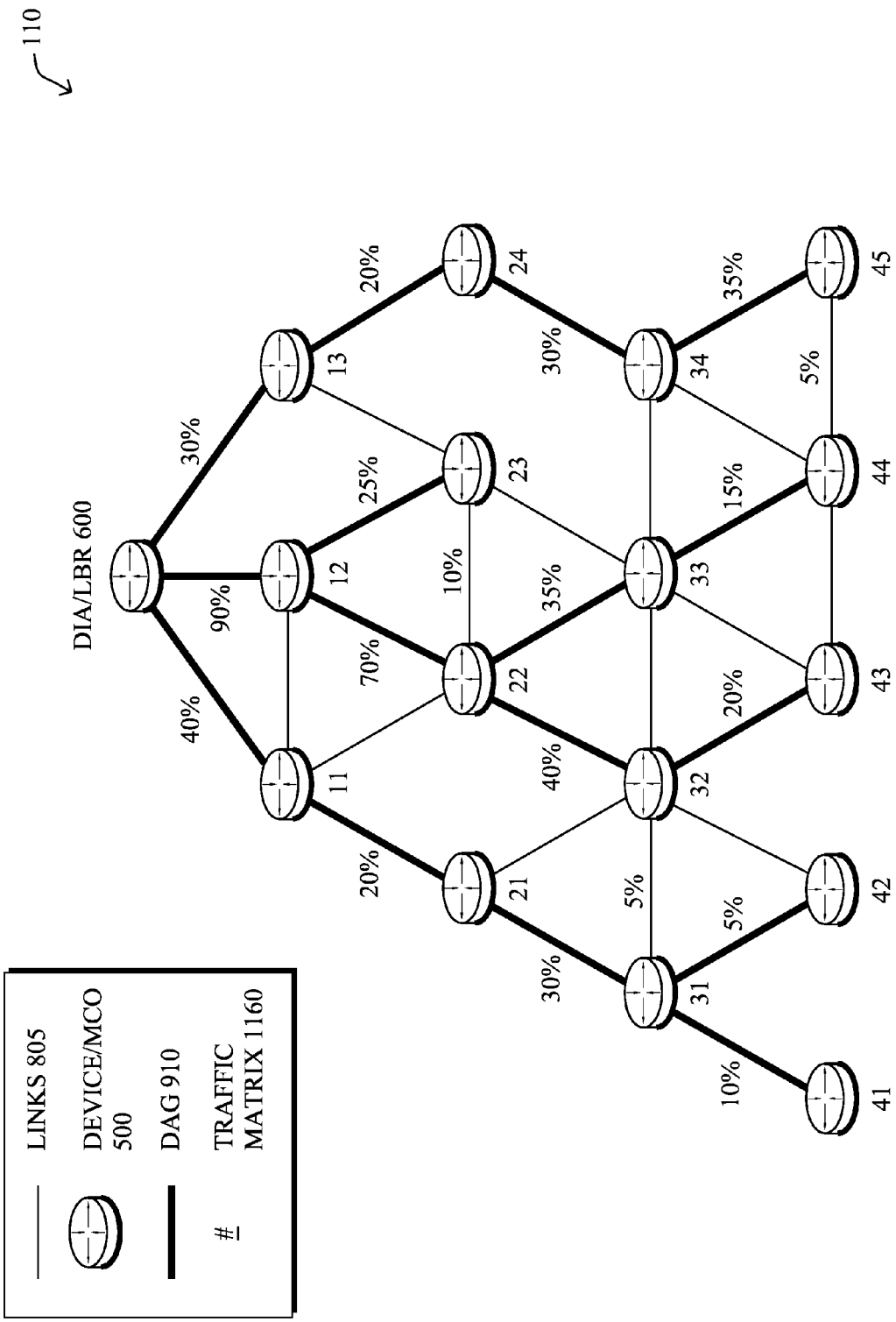
FIG. 11 illustrates an example of a traffic matrix based on the traffic of FIG. 10.

By correlating the source and destination addresses with the network topology 910, even when packets are IP routed (as opposed as source routed), the DIA can compute the Traffic Matrix in the network. As shown in FIG. 11, an illustrative traffic matrix 1160 is shown, having been computed based on source and destination addresses of traffic traversing the DIA, accordingly. In general, the traffic matrix provides an estimate for an amount of traffic on each link of the routing topology. As shown, this estimate is based on percentages of link capacity, though other values, such as utilized bandwidth, available bandwidth, etc., may also be used. Note also that while the traffic matrix 1160 is shown in correlation with the routing topology 910 (and, notably, links not on the DAG, such as where backup parents/next-hops are used occasionally), those skilled in the art will appreciate that storage of the traffic matrix 1160 (e.g., as a data structure 645) may generally comprise a list or table correlating identified links to the computed traffic matrix values.

In particular, each packet or sample is analyzed to determine the amount of traffic transiting on each link accordingly, either by observing the time the packet was received and computing when the traffic was carried onto the various links knowing the links delays and per-node processing times, using time stamping techniques, or simply ignoring networking delays when traffic load is averaged over long time windows (a highly likely scenario since TE is rarely used to handle real-time traffic spikes). In other words, the estimate for the amount of traffic may be based on either a corresponding amount per specific time periods or a long-term average.

Figure 12:
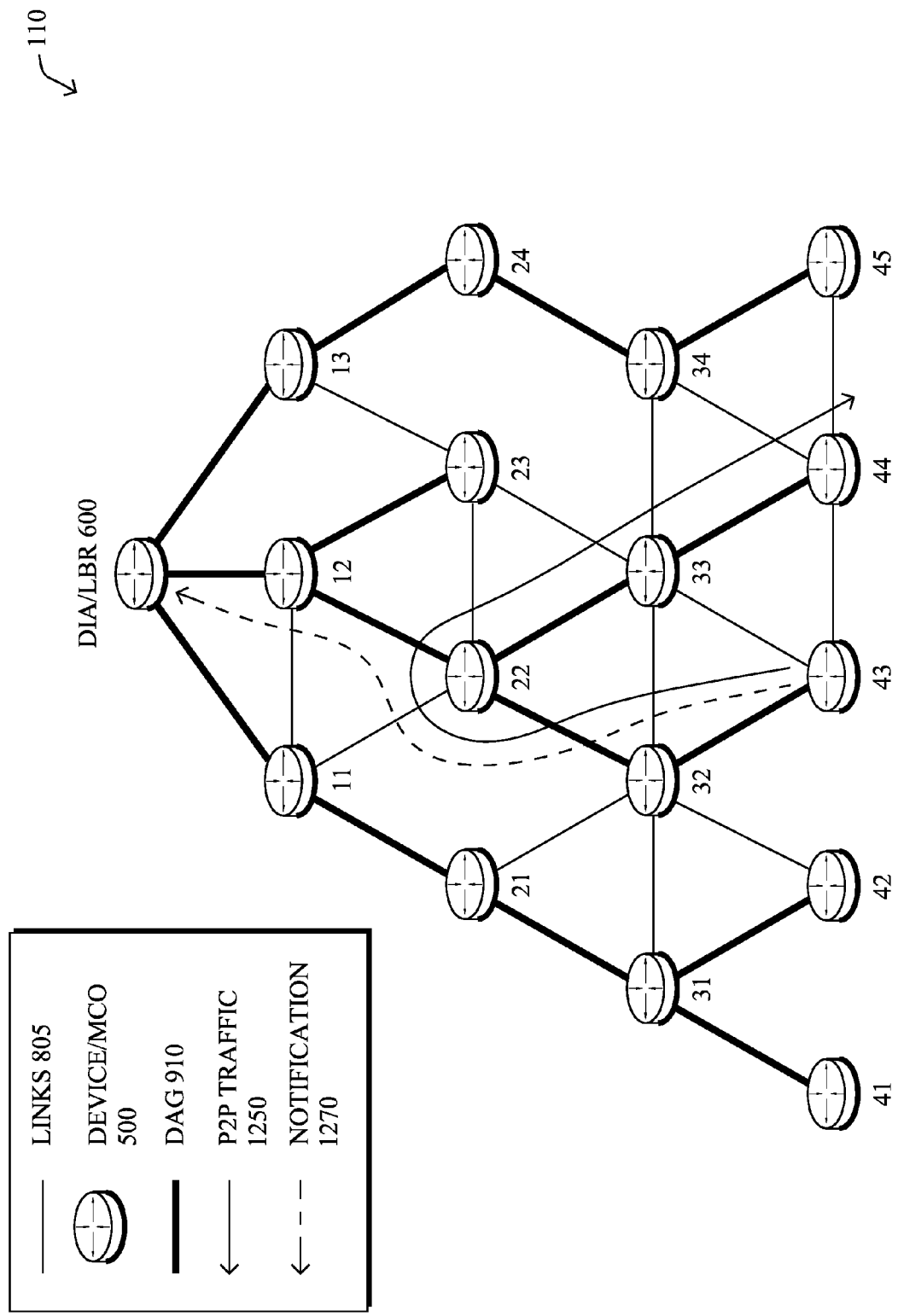
FIG. 12 illustrates an example of a traffic notification.

Note that although the P2P traffic (traffic that does not transit the LBR/DIA) will generally be negligible in LLNs (for the foreseeable future), the techniques herein define a new notification mechanism for remote nodes/MCOs to notify the DIA of the existence of persistent P2P flows. As shown in FIG. 12, for example, when there is P2P traffic 1250 (not traversing the DIA) within the computer network (LLN/IoT domain 110), nodes/MCOs may transmit a notification 1270 to the DIA regarding such traffic. Nodes may illustratively be informed by the DIA (e.g., using DHCP upon registration or the routing protocol) of the threshold T and duration D that trigger such a notification: for example, if a node N sends a traffic flow of more than T Kbits/s for at least D seconds, a message 1270 is then sent to the DIA.

===Identification of the Areas where Traffic should be Engineered===

Figure 13A:
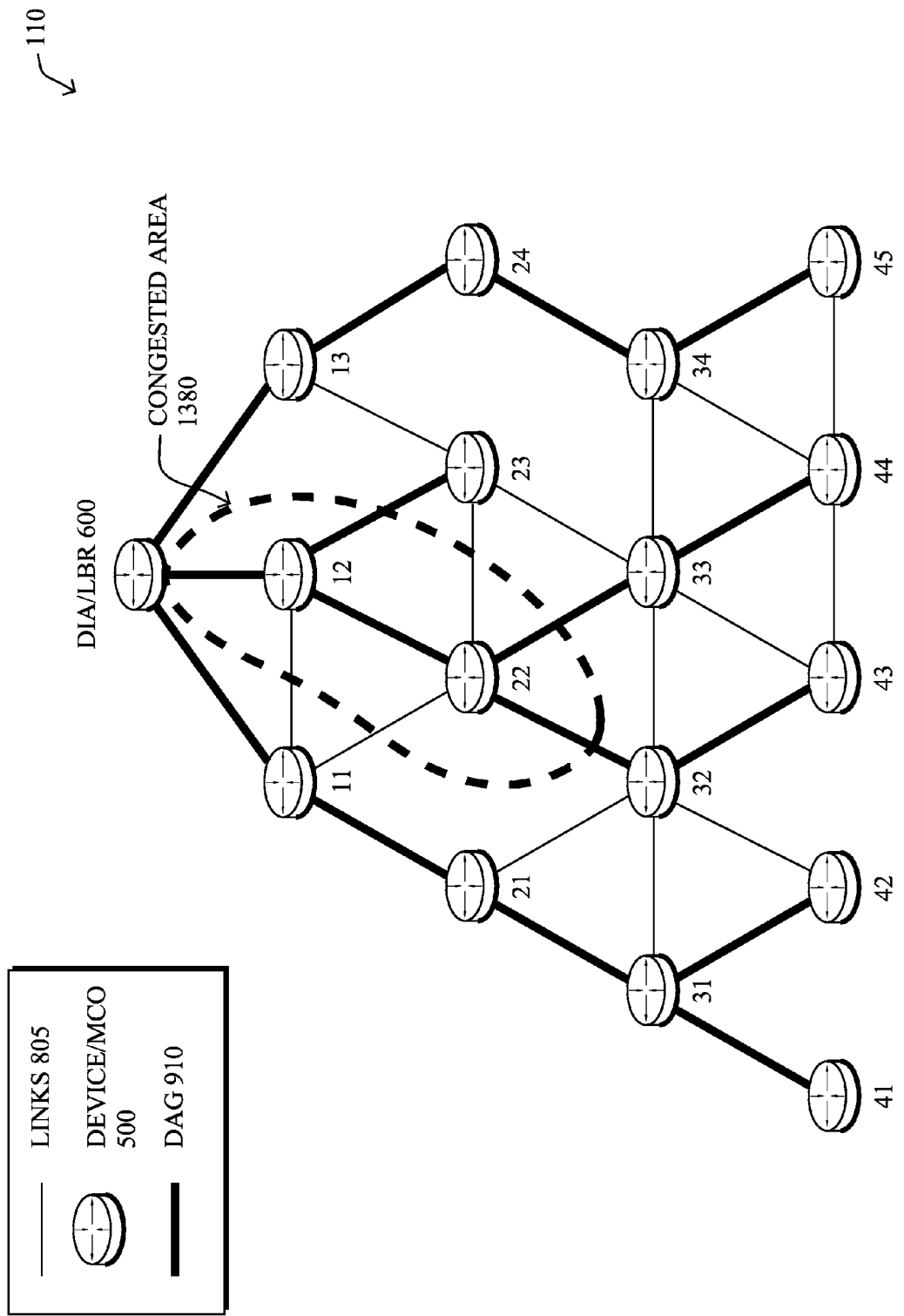
FIGS. 13A-13B illustrate examples of portions of the routing topology that would benefit from traffic engineering.

The next component of the techniques herein consists of determining which portions of the network (the routing topology) to apply traffic engineering. That is, to address high traffic loads, TE could be applied to certain portions based on a threshold for traffic loads on the links as described herein, such as portion 1380 as shown in FIG. 13A. Various techniques may be used, such as, for example:

1) Mapping the resource capabilities and offered traffic load, e.g., where the threshold for traffic loads is a percentage of available link bandwidth. In particular, LLN link technologies (e.g., IEEE 802.15.4 g and P1901.2) typically utilize PHY layers that vary the available throughput, unlike traditional IP networks using links such as Ethernet of SONET/SDH where the link throughput is largely fixed. In the LLN case, for instance, three novel techniques are proposed herein to determine dynamically varied available link bandwidth for individual links in the computer network:

1-a) A new ICMP packet is defined that travels from the DIA to each node in the network (at appropriate times) that records the path and all link bandwidths (in both directions);

1-b) Routing extensions are used to report the available bandwidth: with RPL, for example, the DAO message is extended to carry a new TLV that provides some information about the available bandwidth of the physical link;

1-c) Link capacities are retrieved from the link layer: for example, in networks using IEEE 802.15.4, the link layer provides the number of available slots (unicast versus broadcast, number of channels available, etc.). Similarly other protocols such as TSMP (time synchronized mesh protocol) can provide this data.

Figure 13B:
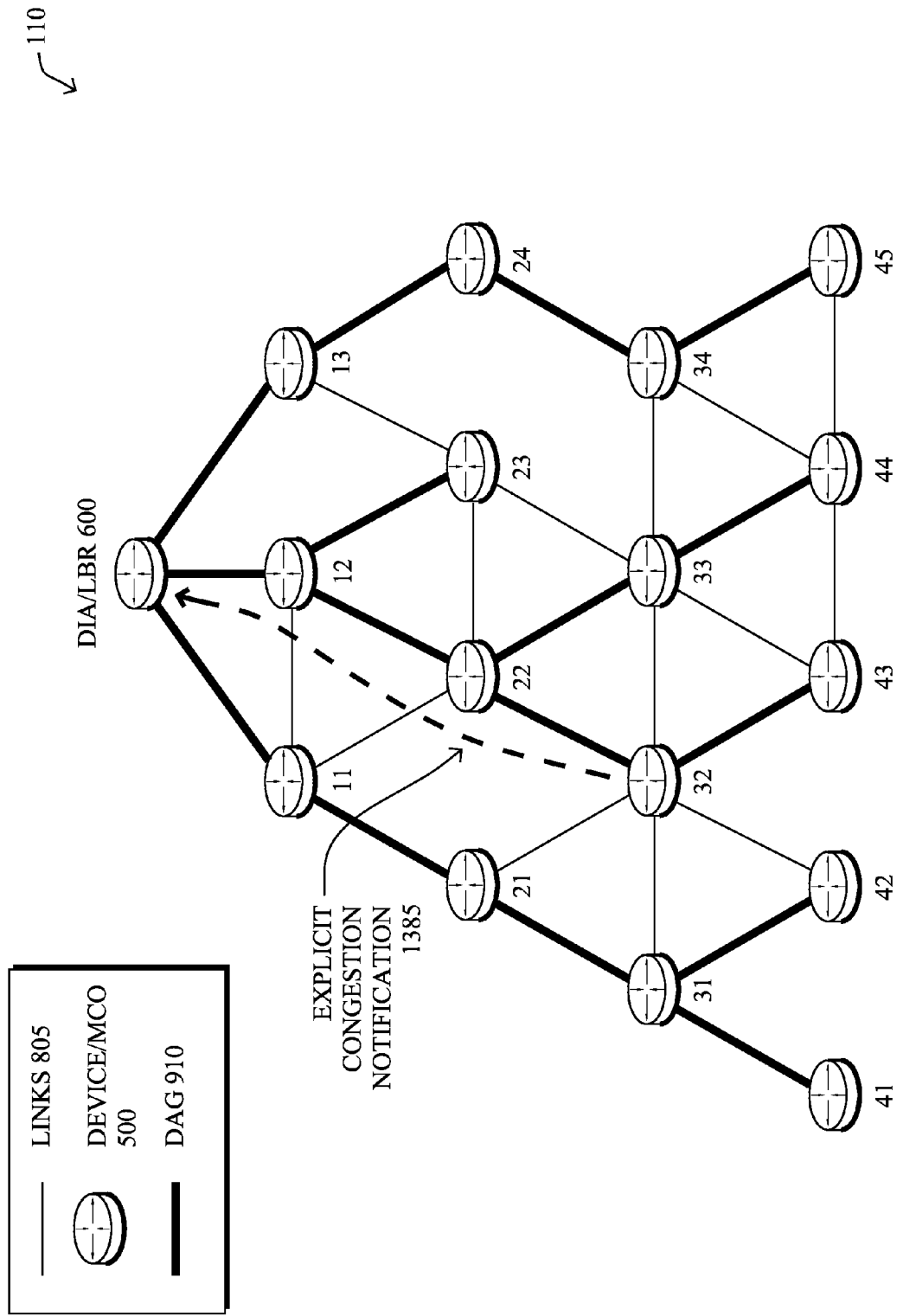

2) Use of an Explicit Congestion Notification (ECN), as shown in FIG. 13B as notification 1385. In particular, ECN marking (for IP and TCP, as described in Request for Comment No. 3168 or "RFC 3168" of the IETF, entitled "The Addition of Explicit Congestion Notification (ECN) to IP" by Ramakrishnan et al., September 2001) has been specified in IP allowing a node to set a flag/field in the packet header reporting congestion along a specific path expecting upper layer to back-off. Other techniques (coloring of Frame Relay packet in Cascade network) have also been used a decade ago for the same purpose. The techniques herein, however, extend the known ECN marking by defining a new header (e.g., IPv6 header) that ads a compressed address of the node experiencing congestion (e.g., using a hash) that indicates the relative location of the corresponding congestion. In this manner, the DIA can determine the exact node/MCO where congestion is experienced. It is also possible that this extension indicates the precise link (e.g., two compressed addresses, or else an interface address).

Note that in either example above, a low-pass filter may be applied to traffic loads (congestion events) when determining where TE should be applied in order to ignore transient events and thus only trigger TE when sustained congestion occurs in the network.

===Applying Assisted Traffic Engineering===

At this stage, the computed traffic matrix is mapped onto the retrieved routing topology, e.g., along with the available bandwidth, so as to identify any (long-lived) congestion areas requiring Traffic Engineering. Accordingly, the DIA may compute a suitable TE solution in order to alleviate such congestion within the network. The last component of the techniques herein then consists of modifying the routing adjacency in the network. Since the vast majority of the link layers used in the IoT are shared links (e.g., IEEE 802.15.4, 802.11, Ethernet, P1901.2, ITU G.hnem, Prime, etc.), by contrast with IP traffic engineering in existing IP networks, the DIA 600 modifies the routing adjacency (next-hop selection) as opposed to the link cost, thus allowing this technique to be applicable to routing protocols that do not support link cost. In other words, the DIA notifies one or more nodes/MCOs in the computer network to change its respective current next-hop in the routing topology to an alternate next-hop based on the computed TE solution (thus changing traffic paths in the network).

Figure 14:
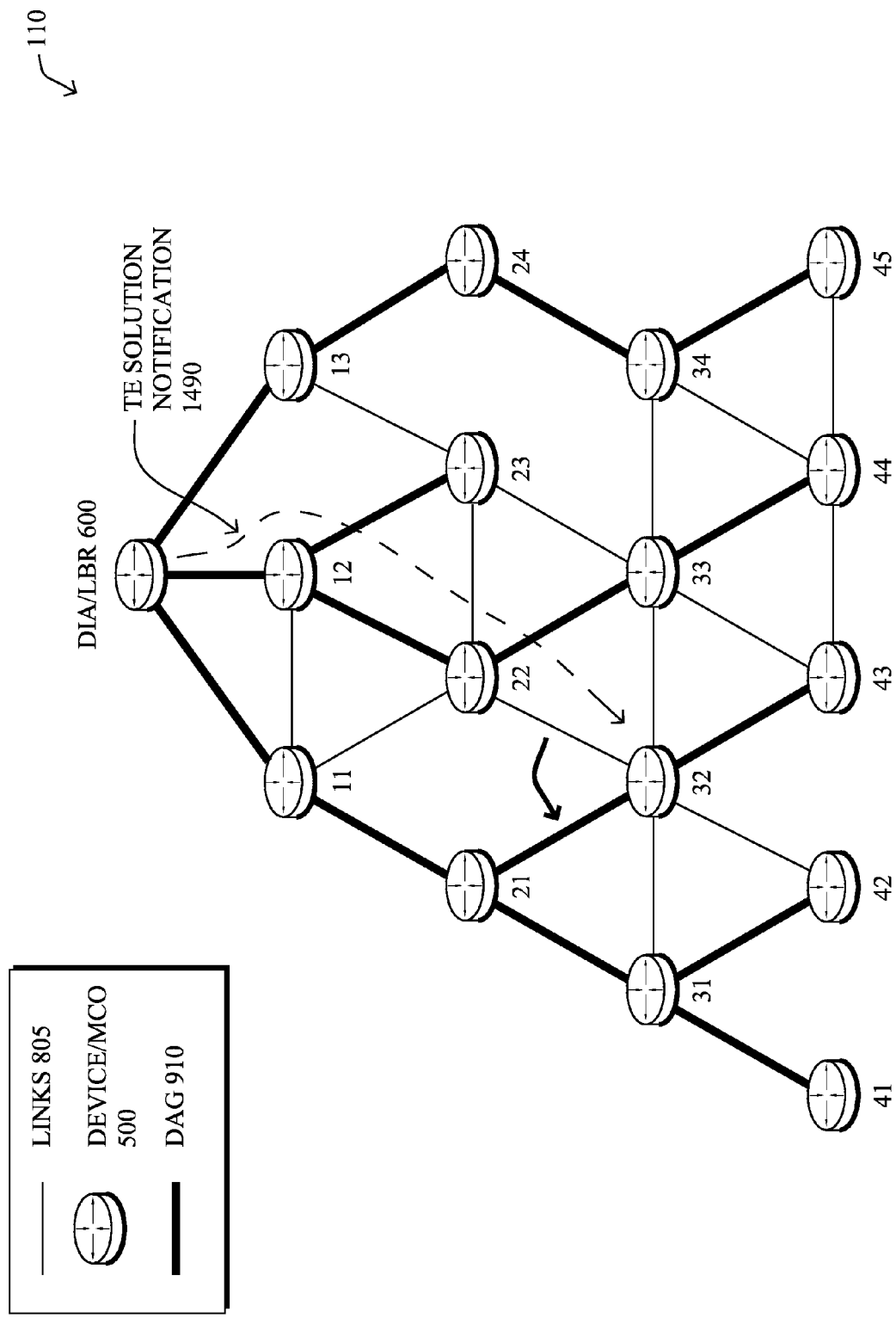
FIG. 14 illustrates an example of assisted traffic engineering in the routing topology.

FIG. 14 illustrates execution of an example TE solution, where a newly defined message 1490 (e.g., using the CoAP protocol, ICMP, etc.) is used to notify the selected nodes in the network to select a new next-hop to route its traffic. Note that the selection of that new next-hop should take into account the consequences of upper links in the network.

In one embodiment, LLN routing protocols (e.g., RPL) allow nodes to select multiple next-hops towards a destination, increasing overall robustness to link failures. These protocols also report these "backup" next-hops to the DIA/LBR, providing the DIA not only with the current preferred route (next-hop), but also available "backup" next-hops. Using these backup next-hops, the DIA may thus select alternate routes when performing Traffic Engineering. Said differently, the TE solution may be computed by the DIA based on known backup next-hops for nodes in the computer network, such that notifying nodes to change its respective current next-hop in the routing topology to the alternate next-hop includes a specified alternate next-hop for each corresponding node.

In another embodiment, where the DIA/LBR does not have enough visibility into the routing topology (e.g., due to use of other routing protocols or else the backup routes do not provide a sufficient alternative) to select appropriate next-hop routes, the DIA may simply notify nodes that they need to select a different next-hop. That is, here the TE solution is computed without known backup next-hops, and the notification to change to an alternate next-hop includes a directive for each node to locally select its corresponding alternate next-hop. In this instance, after suggesting the change, the DIA may wait to see if there is an acceptable change in the traffic matrix. If not, the DIA may suggest changing the next-hop again. If no other next-hop solutions at the particular node provide an adequate TE solution, then other solutions may be attempted, such as redirected traffic at locations further from the particular node itself.

Figure 15:
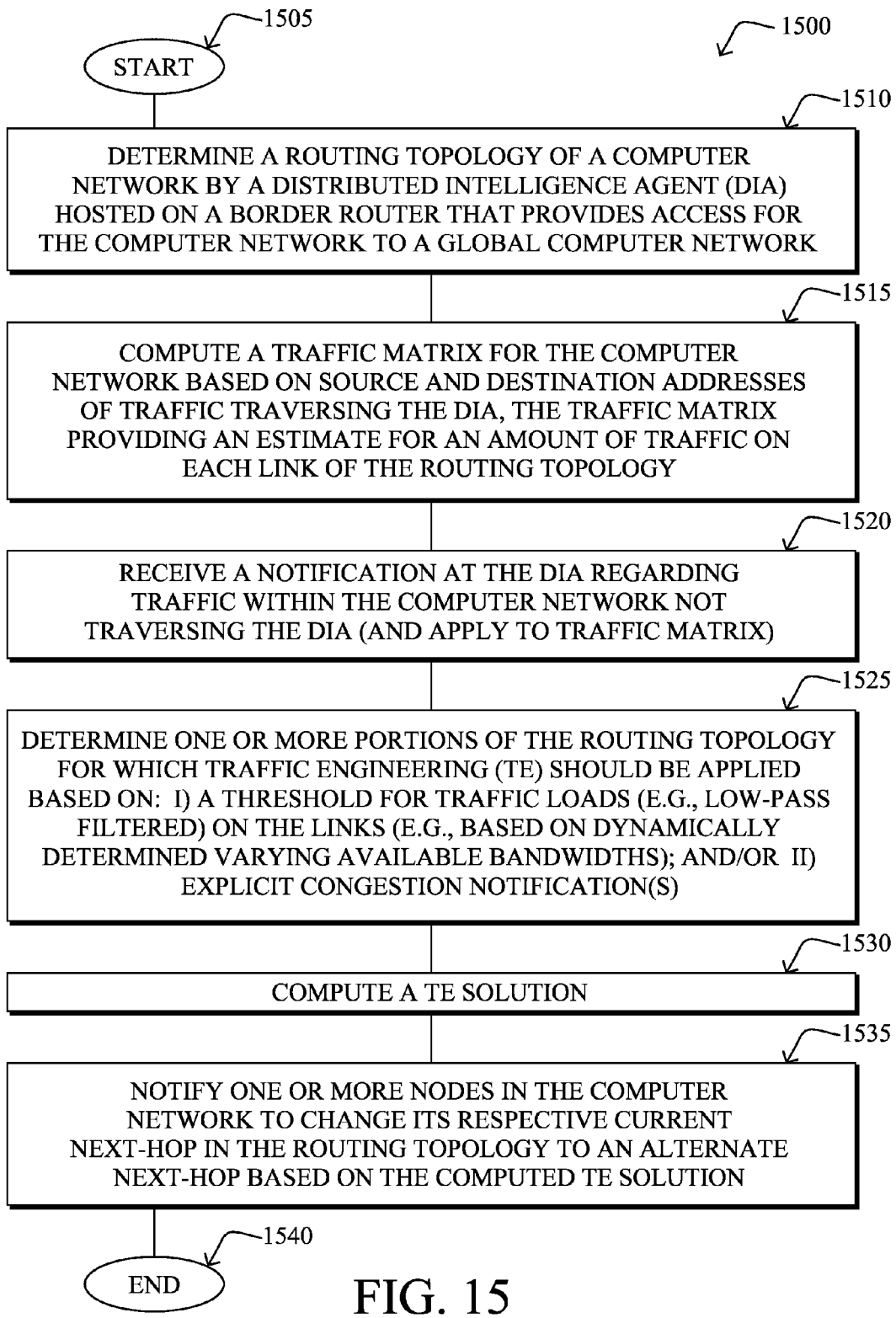
FIG. 15 illustrates an example simplified procedure for assisted traffic engineering, from the perspective of a distributed intelligence agent (DIA).

FIG. 15 illustrates another example simplified procedure for assisted traffic engineering in accordance with one or more embodiments described herein, from the perspective of a distributed intelligence agent (DIA). The procedure 1500 starts at step 1505, and continues to step 1510, where, as described in greater detail above, the DIA 600 (e.g., LBR) determines a routing topology 910 (e.g., DAG) of a computer network. Also, in step 1515, the DIA computes a traffic matrix 1160 for the computer network based on source and destination addresses of traffic traversing the DIA, where the traffic matrix provides an estimate for an amount of traffic on each link of the routing topology. Note that in one or more embodiments, the DIA may also receive a notification 1270 in step 1520 regarding traffic within the computer network not traversing the DIA, and also applies this to the traffic matrix.

In step 1525, the DIA further determines one or more portions of the routing topology for which TE should be applied, as described in detail above. For example, the determination in step 1525 may be based on: i) a threshold for traffic loads (e.g., low-pass filtered) on the links (e.g., based on dynamically determined varying available bandwidths); ii) explicit congestion notification(s), and/or iii) the SLA (e.g., from the CIC), each as mentioned above. Accordingly, in step 1530, the DIA may compute a suitable TE solution, and in step 1535 notifies one or more nodes (e.g., MCOs) in the computer network to change its respective current next-hop in the routing topology to an alternate next-hop based on the computed TE solution (e.g., a specified alternate or else a simple directive to re-select the next-hop). The procedure 1500 illustratively ends in step 1540, though notably the procedure may return to any suitably entry step above, such as updating routing topology, the traffic matrix, receiving congestion notifications, etc. In particular, the procedure may iterate to fine tune traffic engineering, especially where explicit alternate next-hops are not specified.

It should be noted that while certain steps within procedure 1500 may be optional as described above, the steps shown in FIG. 15 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The novel techniques described herein, therefore, provide for assisted traffic engineering for LLNs, particularly where MCOs are used. In particular, the techniques herein propose a lightweight Traffic Engineering technique in the IoT, requiring no heavy signaling or traffic statistic generation, and thus efficiently addresses traffic engineering issues and congestion in the network, which is a major challenge in these highly constrained networks. That is, by allowing the router at the fringe of the LLN (e.g., DIAs) to perform all processing, extra-processing on constrained objects (e.g., MCOs) is not required.

While there have been shown and described illustrative embodiments that provide for assisted traffic engineering for LLNs, particularly where MCOs are used, it is to be understood that various other adaptations and modifications may be made within the spirit and scope of the embodiments herein. For example, the embodiments have been shown and described herein with relation to the specific illustrative IoT architecture described above for use with MCOs. However, the embodiments in their broader sense are not as limited, and may, in fact, be used with other types of networks and/or protocols, such as LLNs in general (with relatively "smart" objects), or even in networks that are not particularly low-powered or lossy. Moreover, while a simplified RPL protocol is shown as creating the routing topology, other simplified routing protocols may be used, e.g., zOSPF, RIP, etc., as noted above. In addition, while the CICs are shown as being separate from the DIAs, in certain embodiments it is possible that the CIC functionality (CIC process 748) may reside locally on one or more DIAs, i.e., the CIC and DIA are a single device configured with both CIC and DIA functionality. Thus (or separately), the DIA may also have an interface to receive user-defined rules and configuration.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining a routing topology of a computer network having a plurality of nodes by a distributed intelligence agent (DIA) hosted on a border router that provides access for the computer network to a global computer network, wherein the DIA is responsible for managing the plurality of nodes in the computer network;

computing, on the DIA, a traffic matrix for the computer network based on source and destination addresses in a header of traffic traversing the DIA in correlation with the routing topology, the traffic matrix providing an estimate for an amount of traffic on each link of the routing topology;

determining, at the DIA, one or more portions of the routing topology for which traffic engineering (TE) should be applied based on a threshold for traffic loads on the links and on one or more explicit congestion notifications received from the nodes in the computer network;

computing a TE solution; and notifying, by the DIA, one or more nodes in the computer network to change its respective current next-hop in the routing topology to an alternate next-hop based on the TE solution computed by the DIA, wherein when the TE solutions is computed based on known backup next-hops for nodes in the computer network, notifying includes providing a specified alternate next-hop for each corresponding node.

2. The method as in claim 1, further comprising:
receiving a notification at the DIA regarding traffic within the computer network not traversing the DIA.

3. The method as in claim 1, wherein the traffic matrix is computed based on one of either all of the traffic or a sample of all of the traffic.

4. The method as in claim 1, wherein the traffic matrix is computed based on packet sizes within the traffic.

5. The method as in claim 1, wherein the traffic matrix is computed based on classes of service of the traffic.

6. The method as in claim 1, wherein the estimate for the amount of traffic is based on one of either a long-term average or a corresponding amount per specific time periods.

7. The method as in claim 1, wherein the threshold for traffic loads is a percentage of available link bandwidth.

8. The method as in claim 7, further comprising:
determining dynamically varied available link bandwidth for individual links in the computer network.

9. The method as in claim 1, wherein the explicit congestion notifications comprise a compressed address that indicates the relative location of the corresponding congestion.

10. The method as in claim 1, wherein
when the TE solution is computed by the DIA without known backup next-hops for nodes in the computer network, notifying includes a directive for each node to locally select its corresponding alternate next-hop.

11. The method as in claim 1, further comprising:
applying a low-pass filter to traffic loads when determining the one or more portions of the routing topology for which TE should be applied based on the threshold for traffic loads on the links.

12. The method as in claim 1, further comprising:
determining the one or more portions of the routing topology for which TE should be applied also based on meeting one or more service level agreements (SLAs).

13. An apparatus, comprising:
one or more network interfaces to communicate with and provide access between a computer network and a global computer network, wherein the apparatus is responsible for managing a plurality of nodes in the computer network;
a processor coupled to the network interfaces and adapted to execute one or more processes; and
a memory configured to store a process executable by the processor, the process when executed operable to:

determine a routing topology of the computer network;
compute a traffic matrix for the computer network based on source and destination addresses in a header of traffic traversing the apparatus in correlation with the routing topology, the traffic matrix providing an estimate for an amount of traffic on each link of the routing topology;
determine one or more portions of the routing topology for which traffic engineering (TE) should be applied based on a threshold for traffic loads on the links and on one or more explicit congestion notifications received from the nodes in the computer network;
compute a TE solution; and
notify one or more nodes in the computer network to change its respective current next-hop in the routing topology to an alternate next-hop based on the computed TE solution,
wherein the apparatus is a distributed intelligence agent (DIA) hosted on a border router that provides access for the computer network to a global computer network, wherein when the TE solutions is computed based on known backup next-hops for nodes in the computer network, notifying includes providing a specified alternate next-hop for each corresponding node.

14. The apparatus as in claim 13, wherein the process when executed is further operable to:
receive a notification regarding traffic within the computer network not traversing the apparatus.

15. The apparatus as in claim 13, wherein the process when executed is further operable to compute the traffic matrix based on one of either all of the traffic or a sample of all of the traffic.

16. The apparatus as in claim 13, wherein the process when executed is further operable to compute the traffic matrix based on at least one of either packet sizes within the traffic or classes of service of the traffic.

17. The apparatus as in claim 13, wherein the estimate for the amount of traffic is based on one of either a long-term average or a corresponding amount per specific time periods.

18. The apparatus as in claim 13, wherein the threshold for traffic loads is a percentage of available link bandwidth, and wherein the process when executed is further operable to determine dynamically varied available link bandwidth for individual links in the computer network.

19. The apparatus as in claim 13, wherein
the explicit congestion notifications comprise a compressed address that indicates the relative location of the corresponding congestion.

20. The apparatus as in claim 13, wherein the process when executed is further operable to:
when the TE solution is computed without known backup next-hops for nodes in the computer network, wherein notifying includes a directive for each node to locally select its corresponding alternate next-hop.

21. A tangible, non-transitory, computer-readable media having software encoded thereon, the software, when executed by a processor on a distributed intelligence agent (DIA) hosted on a border router that provides access for a computer network to a global computer network, operable to:
determine a routing topology of the computer network;
compute at the DIA a traffic matrix for the computer network based on source and destination addresses in a header of traffic traversing the DIA in correlation with the routing topology, the traffic matrix providing an estimate for an amount of traffic on each link of the routing topology, wherein the DIA is responsible for managing the plurality of nodes in the computer network;

determine one or more portions of the routing topology for which traffic engineering (TE) should be applied based on a threshold for traffic loads on the links and on one or more explicit congestion notifications received from the nodes in the computer network;

computing a TE solution;

compute a TE solution; and notify one or more nodes in the computer network to change its respective current next-hop in the routing topology to an alternate next-hop based on the computed TE solution, wherein when the TE solutions is computed based on known backup next-hops for nodes in the computer network, notifying includes providing a specified alternate next-hop for each corresponding node.

22. The computer-readable media as in claim 21, wherein the software when executed is further operable to:

receive a notification regarding traffic within the computer network not traversing the DIA.

\* \* \* \* \*